(12) United States Patent
Nakano et al.

(10) Patent No.: US 11,664,502 B2
(45) Date of Patent: May 30, 2023

(54) ELECTRODE FOR NON-AQUEOUS ELECTROLYTE SECONDARY BATTERY

(71) Applicant: NISSAN MOTOR CO., LTD., Yokohama (JP)

(72) Inventors: Takeshi Nakano, Kanagawa (JP); Hiroyuki Tanaka, Kanagawa (JP); Takamasa Nakagawa, Kanagawa (JP); Sota Shibahara, Kanagawa (JP); Kenichiro Enoki, Kyoto (JP); Yoshihiro Ikeda, Kyoto (JP); Naoki Maeo, Kyoto (JP); Shogo Isomura, Kyoto (JP)

(73) Assignee: NISSAN MOTOR CO., LTD., Yokohama (JP)

( * ) Notice: Subject to any disclaimer, the term of this patent is extended or adjusted under 35 U.S.C. 154(b) by 454 days.

(21) Appl. No.: 16/754,254

(22) PCT Filed: Oct. 10, 2018

(86) PCT No.: PCT/JP2018/037819
§ 371 (c)(1),
(2) Date: Apr. 7, 2020

(87) PCT Pub. No.: WO2019/074029
PCT Pub. Date: Apr. 18, 2019

(65) Prior Publication Data
US 2020/0274164 A1     Aug. 27, 2020

(30) Foreign Application Priority Data

Oct. 10, 2017   (JP) .............................. JP2017-196953

(51) Int. Cl.
*H01M 4/62*     (2006.01)
*H01M 4/04*     (2006.01)
(Continued)

(52) U.S. Cl.
CPC ......... *H01M 4/623* (2013.01); *H01M 4/0404* (2013.01); *H01M 10/0525* (2013.01); *H01M 10/0566* (2013.01)

(58) Field of Classification Search
CPC ............... H01M 4/623; H01M 4/0404; H01M 10/0525; H01M 10/0566; H01M 10/056; H01M 10/054; H01M 4/13; Y02E 60/10
See application file for complete search history.

(56) References Cited

U.S. PATENT DOCUMENTS

2007/0154787 A1\* 7/2007 Jang .................... H01M 50/528
429/174
2013/0095365 A1\* 4/2013 Nishikawa ............ H01M 50/44
429/144
(Continued)

FOREIGN PATENT DOCUMENTS

EP          1067612 A1 \*  1/2001  .............. H01M 4/04
JP      2001-338650 A    12/2001
(Continued)

*Primary Examiner* — Christian Roldan
(74) *Attorney, Agent, or Firm* — Foley & Lardner LLP

(57) ABSTRACT

To provide an electrode for a non-aqueous electrolyte secondary battery which retains the shape while retaining a discharge capacity at a high rate.
An electrode for a non-aqueous electrolyte secondary battery has a current collector and an electrode active material layer arranged on a surface of the current collector, and is used for a non-aqueous electrolyte secondary battery having a liquid volume coefficient of 1.4 to 2.0, in which the electrode active material layer includes an electrode active material and a binder including polyvinylidene fluoride (PVdF), and the polyvinylidene fluoride (PVdF) is in a non-crystallized state and is included in the range of 0.5 to 3.3% by volume with respect to the total volume of the electrode in the electrode active material layer.

3 Claims, 3 Drawing Sheets

(51) Int. Cl.
*H01M 10/0525* (2010.01)
*H01M 10/0566* (2010.01)

(56) References Cited

U.S. PATENT DOCUMENTS

| | | | | |
|---|---|---|---|---|
| 2013/0189602 A1* | 7/2013 | Lahiri | .................... | H01G 4/015 |
| | | | | 977/762 |
| 2015/0303464 A1* | 10/2015 | Watanabe | ........... | H01M 10/052 |
| | | | | 429/231.5 |
| 2015/0311517 A1* | 10/2015 | Yamamoto | ............ | C23C 14/165 |
| | | | | 429/229 |
| 2016/0133910 A1* | 5/2016 | Taguchi | .............. | H01M 50/562 |
| | | | | 429/162 |
| 2019/0288293 A1 | 9/2019 | Arihara et al. | | |

FOREIGN PATENT DOCUMENTS

| | | | |
|---|---|---|---|
| JP | 2006-066243 A | 3/2006 |
| JP | 2013-84416 A | 5/2013 |
| JP | 2013-218895 A | 10/2013 |
| JP | 2015-76248 A | 4/2015 |
| JP | 2016-186921 A | 10/2016 |
| JP | 2017-183082 A | 10/2017 |
| WO | WO 2018/083917 A1 | 5/2018 |

\* cited by examiner

ELECTRODE FOR NON-AQUEOUS ELECTROLYTE SECONDARY BATTERY

TECHNICAL FIELD

The present invention relates to an electrode for a non-aqueous electrolyte secondary battery.

BACKGROUND ART

In recent years, various electric vehicles have been expected to be distributed in order to solve environmental/energy issues. Intensive efforts have been made to develop a secondary battery as a vehicle-mounted power source such as a motor driving power source or the like which holds the key in distribution of those electric vehicles. A secondary battery having a higher energy density is preferable in order to extend a cruising distance at a first round of charge in an electric vehicle.

Examples of a means for increasing the energy density of a battery include a method involving increasing the density of an active material in an electrode active material layer. However, if the density of the active material in the active material layer is increased, pores in the active material layer are reduced and the electrolyte (electrolyte solution) required for a charging and discharging reaction is not sufficiently permeated and held in some cases. As a result, problems such as a reduction in the energy density of the battery and deterioration in input-output characteristics at a high rate (charge/discharge performance at a high speed) and charge/discharge cycle characteristics (cycle durability) may rather occur.

Examples of technology for improving the battery charge/discharge cycle characteristics (cycle durability) of a battery include the technology described in JP 2006-66243 A. Specifically, in the technology described in JP 2006-66243 A, an active material mixture paste including a dispersant (a solvent such as N-methyl-2-pyrrolidone (NMP) and the like) and a binder is first applied onto a current collector. Then, the dispersant is removed by drying and a coating film is pressurized and subjected to a heat treatment at a temperature that is equal to or higher than the crystallization temperature and lower than the melting point of the binder. It is disclosed that, by producing an electrode for a non-aqueous electrolyte secondary battery as above, it is possible to improve the adhesion of the active material mixture, the conductivity of an electrode plate, and the like. It is also disclosed that it is possible to improve cycle durability as a result of such an improvement.

SUMMARY OF INVENTION

Technical Problem

However, according to the studies conducted by the present inventors, it was revealed that, when the technology described in JP 2006-66243 A is applied, cracks are generated in an electrode active material layer in a step of drying and removing a dispersant in some cases. In addition, it was also revealed that, if the cracks are generated in the electrode active material layer, deterioration in battery characteristics such as an increase in the internal resistance of a battery, a reduction in cycle durability, and easier precipitation of lithium are caused.

With regard to this problem, the present inventors have studied a method for producing an electrode active material layer without using a binder as a method for obtaining an electrode active material layer while not performing a drying step. However, according to the studies conducted by the present inventors, it was revealed that, if an electrolyte solution is injected into a battery having an electrode active material layer obtained by such a method, collapse of the electrode active material layer may occur in some cases. It is necessary to reduce a liquid volume coefficient of the battery (to reduce the amount of the electrolyte solution to be injected into the battery) to suppress the occurrence of the collapse, which can, however, cause a shortage of the electrolyte solution, and thus, the cycle durability of the battery can be lowered.

Thus, there is a demand for an electrode active material layer which retains the shape while retaining a discharge capacity at a high rate.

Therefore, it is an object of the present invention to provide an electrode for a non-aqueous electrolyte secondary battery, which has excellent shape retention of an electrode active material layer and exhibits high cycle durability while retaining a discharge capacity at a high rate.

Solution to Problem

The present inventors have conducted extensive studies to solve the problems. As a result, they have found that the problems can be solved by incorporating a specific amount of a specific binder into an electrode active material layer, thereby leading to completion of the present invention.

That is, an aspect of the present invention is an electrode for a non-aqueous electrolyte secondary battery, which has a current collector and an electrode active material layer arranged on a surface of the current collector, and is used for a non-aqueous electrolyte secondary battery having a liquid volume coefficient of 1.4 or more. Here, in the electrode, the electrode active material layer includes an electrode active material and a binder formed of polyvinylidene fluoride (PVdF), and the polyvinylidene fluoride (PVdF) is in a non-crystallized state and is included in the range of 0.5 to 3.3% by volume with respect to the total volume of the electrode in the electrode active material layer.

DESCRIPTION OF EMBODIMENTS

Figure 1:
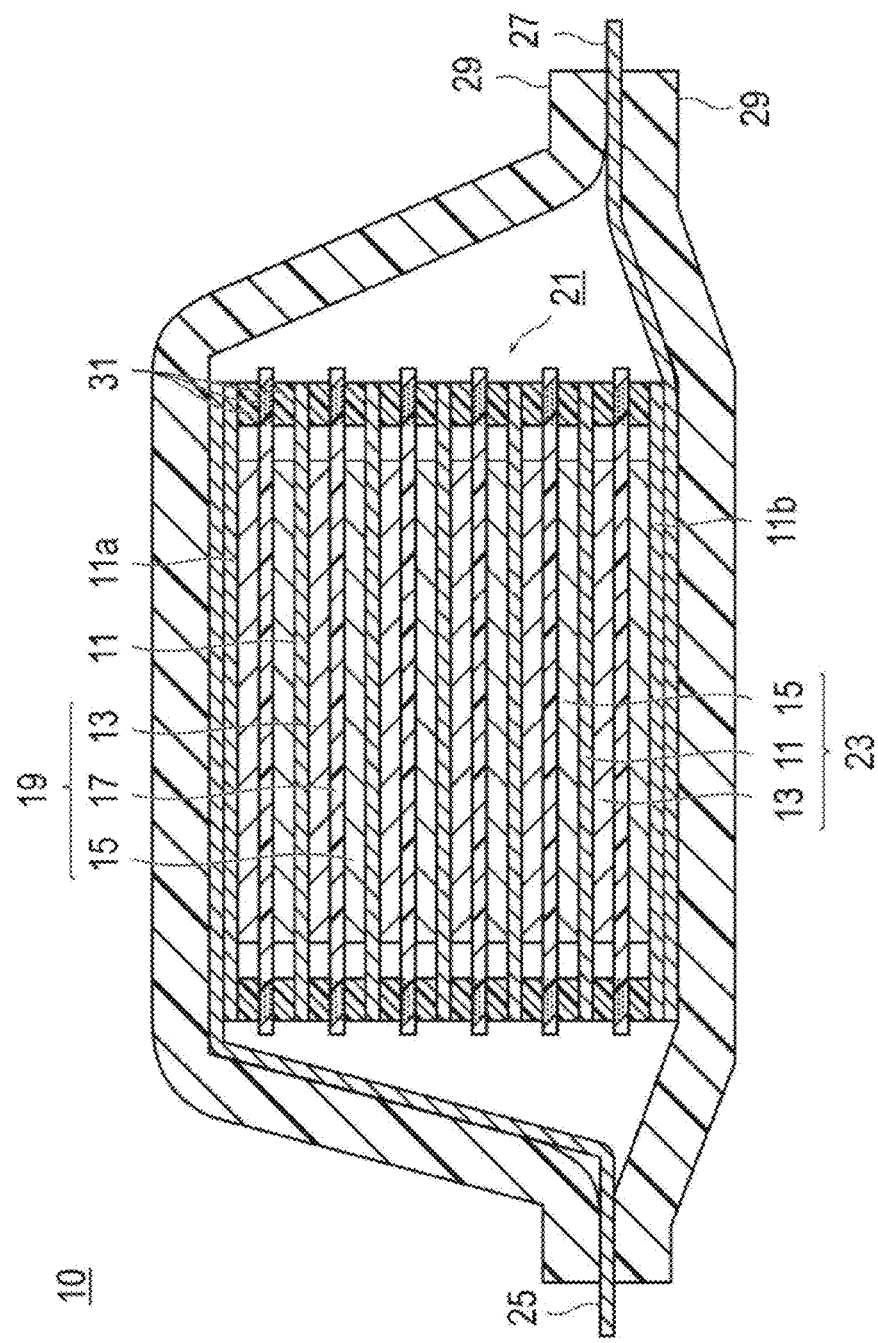
FIG. 1 is a cross-sectional view schematically illustrating a bipolar secondary battery which is one embodiment of the present invention.

The electrode for a non-aqueous electrolyte secondary battery according to one aspect of the present invention is used for a non-aqueous electrolyte secondary battery having a liquid volume coefficient of 1.4 or more, and has a current collector and an electrode active material layer arranged on a surface of the current collector. In this case, the electrode active material layer includes an electrode active material and a binder formed of polyvinylidene fluoride (PVdF), and the polyvinylidene fluoride (PVdF) is in a non-crystallized state and is included in the range of 0.5 to 3.3% by volume with respect to the total volume of the electrode in the electrode active material layer. By the electrode for a non-aqueous electrolyte secondary battery according to the present aspect, it is possible to obtain a non-aqueous electrolyte secondary electrode which has excellent shape retention of the electrode active material layer while retaining a discharge capacity at a high rate, and exhibits high cycle durability.

With this configuration, it is possible to obtain an electrode for a non-aqueous electrolyte secondary battery which retains the shape while retaining a discharge capacity at a high rate.

Detailed mechanism by which the present invention exerts the above effects is unknown, but is presumed as follows. Further, the technical scope of the present invention is not limited to the following mechanism.

In the production of a non-aqueous electrolyte secondary battery in the related art, a paste or a slurry is prepared by mixing an electrode active material, a binder, a dispersant, and the like, and the paste or the slurry is applied and dried to remove an organic solvent, thereby manufacturing an electrode active material layer. By this drying step, crystallization of the binder proceeds, and thus, an electrode active material layer having excellent shape retention can be obtained. However, it was revealed that when the present inventors have applied this method in order to increase the energy density of a battery to manufacture an electrode active material layer, cracks may be generated in the drying step in some cases. A reason therefor is considered to be the occurrence of thermal shrinkage of the electrode active material layer due to the crystallization of the binder.

Therefore, the present inventors have studied a method for producing an electrode active material layer with no use of a binder as a method for obtaining an electrode active material layer while not carrying out a drying step. However, according to the studies conducted by the present inventors, it was revealed that collapse of the electrode active material layer occurs if an electrolyte solution is injected into an electrode having an electrode active material layer obtained by such the method. A reason therefor is considered to be a low binding property between the electrode active materials and poor shape retention of the layer due to the absence of a binder in the electrode active material layer.

Therefore, the present inventors have conducted extensive studies and have found that the problems can be solved by using polyvinylidene fluoride (PVdF) in a non-crystallized state in the range of 0.5 to 3.3% by volume with respect to the total volume of the electrode as a binder of the electrode active material layer, thereby leading to completion of the present invention. If an electrode active material layer is produced using PVdF, the PVdF can bind the electrode active material layer even while not carrying out a drying step. A reason therefor is considered to be that polyvinylidene fluoride (PVdF) forms a fibrous structure by appropriately having a low crystalline region and a high crystalline region, and is physically entangled with the electrode active material. Thus, the electrode active materials can be bound to each other via PVdF and thus, the shape retention of the electrode active material layer can be enhanced. Therefore, the electrolyte solution can be injected at a high injection amount and a shortage of the electrolyte solution can thus be prevented. In addition, in the present invention, since the drying step is not required as described above, the generation of cracks in the electrode active material layer can be prevented. Therefore, the cycle durability of a battery can be improved. Further, it is also revealed that if an excessive amount of polyvinylidene fluoride (PVdF) is used as a binder, a sufficient discharge capacity cannot be obtained at a high rate in some cases. A reason therefor is considered to be that lithium ions are hardly diffused into the electrode active material layer. Accordingly, by using a specified amount (0.5 to 3.3% by volume with respect to the total volume of the electrode) of polyvinylidene fluoride (PVdF), the discharge capacity at a high rate can be retained while imparting a binding force capable of retaining an electrode shape among the active material particles.

Hereinafter, although the embodiments of the present invention will be described with reference to drawings, the technical scope of the present invention should be determined based on the description of claims and is not limited only to the following aspects. As a preferred embodiment of the present invention, a bipolar lithium ion secondary battery, which is one kind of non-aqueous electrolyte secondary batteries, will be described, but is not limited to only the following embodiments. Incidentally, the dimensional ratio in the drawings is exaggerated for the sake of convenience of the description and may differ from the actual ratio in some cases. In the present specification, "X to Y" indicating a range means "X or more and Y or less". In addition, operation and measurement of physical properties and the like are performed under conditions of room temperature (20 to 25° C.)/relative humidity of 40 to 50% RH unless otherwise specified.

In the present specification, the bipolar lithium ion secondary battery is simply referred to as a "bipolar secondary battery" and an electrode for the bipolar lithium ion secondary battery is also simply referred to as a "bipolar electrode".

<Bipolar Secondary Battery>

FIG. 1 is a cross-sectional view schematically illustrating a bipolar secondary battery which is one embodiment of the present invention. A bipolar secondary battery 10 shown in FIG. 1 has a structure in which a substantially rectangular power generating element 21, where a charging and discharging reaction actually proceeds, is sealed inside a laminate film 29 as a battery outer casing body.

As shown in FIG. 1, the power generating element 21 of the bipolar secondary battery 10 of the present aspect has a plurality of bipolar electrodes 23 in which a positive electrode active material layer 13 electrically bonded to one surface of a current collector 11 is formed and a negative electrode active material layer 15 bonded to the other surface of the current collector 11 is formed. The respective bipolar electrodes 23 are laminated via an electrolyte layer 17 to form the power generating element 21. Furthermore, the electrolyte layer 17 has a configuration in which an electrolyte is supported in planar center part of a separator as a substrate. In this case, each of the bipolar electrodes 23 and the electrolyte layer 17 are alternately laminated such that the positive electrode active material layer 13 of one of the bipolar electrodes 23 and the negative electrode active material layer 15 of the other bipolar electrode 23 that is adjacent to the one bipolar electrode 23 can face each other via the electrolyte layer 17. That is, these are arranged such that the electrolyte layer 17 is inserted between the positive electrode active material layer 13 of the one bipolar electrode 23 and the negative electrode active material layer 15 of the other bipolar electrode 23 that is adjacent to the one bipolar electrode 23.

Figure 2A:
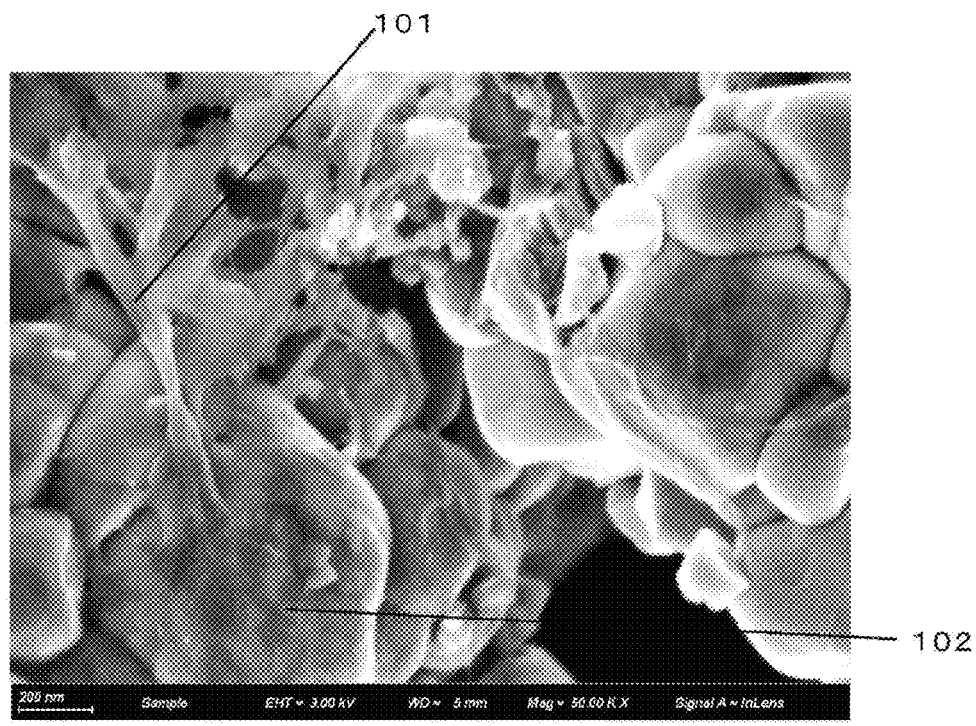
FIG. 2A is a scanning electron microscope (SEM) photograph illustrating a state where polyvinylidene fluoride (PVdF) in a non-crystallized state binds the constituents of an electrode active material layer, in a fibrous form.
Figure 2B:
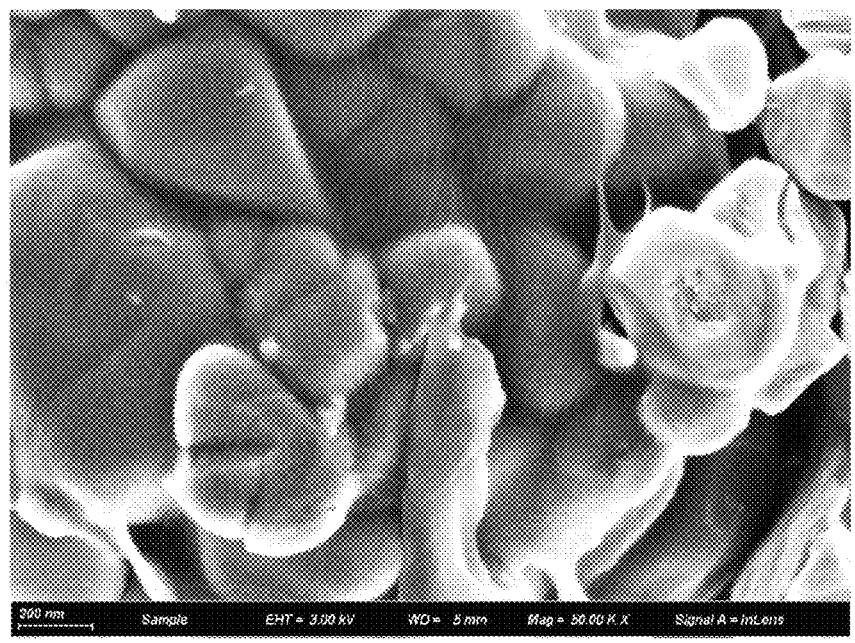
FIG. 2B is a scanning electron microscope (SEM) photograph illustrating a state where polyvinylidene fluoride (PVdF) is included in an electrode active material layer in a state where it is crystallized under external stimulation such as a heat treatment and the like to form a spherical crystal.

Moreover, in the bipolar secondary battery 10 in FIG. 1, the positive electrode active material layer 13 includes a positive electrode active material formed of $LiNi_{0.8}Co_{0.15}Al_{0.05}O_2$, acetylene black, and a carbon fiber (carbon nanofiber) as the conductive aid. The carbon fiber forms a conductive path which electrically connects a first principal surface in contact with the electrolyte layer 17 side of the positive electrode active material layer 13 to a second principal surface in contact with the current collector 11 side, and furthermore, the conductive path and the positive electrode active material are electrically connected with each other. In addition, the positive electrode active material layer 13 includes polyvinylidene fluoride (PVdF) in a non-crystallized state as a binder. In the present embodiment, from the viewpoint that PVdF in the non-crystallized state has a fibrous shape, PVdF 101 in a non-crystallized state binds the positive electrode active material 102, in the fibrous form as shown in FIG. 2A. Here, the expression that the binder "binds" the electrode active material "in the fibrous form" means that the binder binds the electrode active materials in the fibrous form as shown in FIG. 2A. In addition, if polyvinylidene fluoride (PVdF) is crystallized under external stimulation such as a heat treatment and the like, it forms a spherical crystal as shown in FIG. 2B. If polyvinylidene fluoride (PVdF) forms a spherical crystal by crystallization, the electrode active material cannot be "bound in the fibrous form". That is, "PVdF in a non-crystallized state" means a state where a spherical crystal is not confirmed when PVdF is observed with a scanning electron microscope (SEM). Similarly, "PVdF in a crystallized state" means a state where a spherical crystal is confirmed when PVdF is observed with a scanning electron microscope (SEM).

Similarly, the negative electrode active material layer 15 includes a negative electrode active material formed of hard carbon (hardly graphitized carbon), acetylene black as a conductive aid, and a carbon fiber (carbon nanofiber) as a conductive aid. In the negative electrode active material layer 15, the carbon fiber forms a conductive path electrically connecting a first principal surface in contact with the electrolyte layer 17 side of the negative electrode active material layer 15 to a second principal surface in contact with the current collector 11 side. The negative electrode active material layer 15 includes polyvinylidene fluoride (PVdF) in a non-crystallized state as a binder. Thus, the PVdF in the non-crystallized state binds the negative electrode active material in a fibrous form.

The positive electrode active material layer 13, the electrolyte layer 17, and the negative electrode active material layer 15 which are adjacent to each other form one single battery layer 19. Thus, it may be mentioned that the bipolar secondary battery 10 has a configuration in which the single battery layer 19 is laminated. In addition, a seal part (insulating layer) 31 is arranged on outer periphery of the single battery layer 19. Accordingly, liquid junction caused by leakage of an electrolyte solution from the electrolyte layer 17 is prevented, and a contact between neighboring current collectors 11 in a battery or an occurrence of a short-circuit resulting from subtle displacement of an end part of the single battery layer 19 in the power generating element 21, or the like is prevented. Furthermore, the positive electrode active material layer 13 is formed on only one surface of the outermost layer current collector 11a on the positive electrode side which is present on the outermost layer of the power generating element 21. In addition, the negative electrode active material layer 15 is formed on only one surface of the outermost layer current collector 11b on the negative electrode side which is present on the outermost layer of the power generating element 21.

Furthermore, in the bipolar secondary battery 10 shown in FIG. 1, a positive electrode current collecting plate (positive electrode tab) 25 is arranged such that it is adjacent to the outermost layer current collector 11a on the positive electrode side, and extended and drawn from the laminate film 29 as a battery outer casing body. On the other hand, a negative electrode current collecting plate (negative electrode tab) 27 is arranged such that it is adjacent to the outermost layer current collector 11b on the negative electrode side, and also extended and drawn from the laminate film 29.

Moreover, the number of times of laminating the single battery layer 19 is adjusted depending on a desired voltage. Incidentally, in the bipolar secondary battery 10, the number of times of laminating the single battery layer 19 may be reduced if a sufficient output can be secured even if the thickness of the battery is made as small as possible. It is also preferable for the bipolar secondary battery 10 to have a structure in which the power generating element 21 is sealed under reduced pressure in the laminate film 29 as a battery outer casing body and the positive electrode current collecting plate 25 and the negative electrode current collecting plate 27 are drawn to the outside of the laminate film 29 in order to prevent an impact from outside and environmental deterioration at the time of use. In addition, although the embodiments of the present invention are described herein by way of an example of a bipolar secondary battery, the type of a non-aqueous electrolyte secondary battery to which the present invention can be applied is not particularly limited. For example, the present invention can also be applied to any non-aqueous electrolyte secondary battery known in the art, such as a so-called parallel laminate type battery in which a power generating element is formed of single battery layers connected to each other in parallel.

Accordingly, an embodiment of the present invention provides the non-aqueous electrolyte secondary battery having the electrode for a non-aqueous electrolyte secondary battery.

Hereinbelow, main constitutional elements of the bipolar secondary battery of the present aspect will be described.

[Current Collector]

The current collector has a function of mediating electron transfer from one surface in contact with a positive electrode active material layer to the other surface in contact with a negative electrode active material layer. Although a material that constitutes the current collector is not particularly limited, for example, a metal or a resin with conductivity can be adopted.

Specific examples of the metal include aluminum, nickel, iron, stainless steel, titanium, copper, and the like. In addition to those, a clad material of nickel and aluminum, a clad material of copper and aluminum, a plating material of a combination of those metals, or the like can be preferably used. It may also be a foil obtained by coating aluminum on a metal surface. Among those, from the viewpoints of electron conductivity, a battery operating potential, adhesion of a negative electrode active material by sputtering to a current collector, and the like, aluminum, stainless steel, copper, or nickel is preferable.

Furthermore, examples of the latter resin having conductivity include a resin formed by adding a conductive filler to a conductive polymer material or a non-conductive polymer material, as necessary. Examples of the conductive polymer material include polyaniline, polypyrrole, polythiophene, polyacetylene, polyparaphenylene, polyphenylene vinylene, polyacrylonitrile, polyoxadiazole, and the like. These conductive polymer materials are advantageous in terms of easiness of a production step or reduction in the weight of the current collector since the conductive polymer materials have sufficient conductivity even without addition of a conductive filler.

Examples of the non-conductive polymer material include polyethylene (PE; high density polyethylene (HDPE), low density polyethylene (LDPE) and the like), polypropylene (PP), polyethylene terephthalate (PET), polyether nitrile (PEN), polyimide (PI), polyamideimide (PAI), polyamide (PA), polytetrafluoroethylene (PTFE), styrene-butadiene rubber (SBR), polyacrylonitrile (PAN), polymethyl acrylate (PMA), polymethyl methacrylate (PMMA), polyvinyl chloride (PVC), polyvinylidene fluoride (PVdF), polystyrene (PS), and the like. Such non-conductive polymer materials can have excellent voltage resistance or solvent resistance.

A conductive filler can be added to the conductive polymer material or the non-conductive polymer material, as necessary. In particular, in a case where a resin serving as a base material of the current collector includes only a non-conductive polymer, a conductive filler is necessarily indispensable in order to impart conductivity to the resin.

As the conductive filler, any material having conductivity can be used without particular limitation. Examples of the material having excellent conductivity, potential resistance, or lithium ion shielding properties include a metal, a conductive carbon, and the like. The metal is not particularly limited, but it is preferable that the metal includes at least one metal selected from the group consisting of Ni, Ti, Al, Cu, Pt, Fe, Cr, Sn, Zn, In, Sb, and K, or an alloy or metal oxide including such the metal. Further, the conductive carbon is not particularly limited. It is preferable that the conductive carbon includes at least one selected from the group consisting of acetylene black, VULCAN (registered trademark), BLACK PEARL (registered trademark), carbon nanofiber, Ketjen black (registered trademark), carbon nanotube, carbon nanohorn, carbon nanobaloon, and fullerene.

The amount of the conductive filler to be added is not particularly limited as long as it can impart sufficient conductivity to the current collector, and is generally approximately 5 to 80% by mass.

Furthermore, the current collector of the present aspect may have a single-layer structure formed of a single material or a laminate structure in which layers composed for those materials are suitably combined. From the viewpoint of reduction in the weight of the current collector, it is preferable to include a conductive resin layer formed of at least a resin having conductivity. In addition, from the viewpoint of blocking the transfer of lithium ions between the single battery layers, a metal layer may be disposed on a part of the current collector.

[Electrode Active Material Layer (Positive Electrode Active Material Layer or Negative Electrode Active Material Layer)]

The electrode active material layer (the positive electrode active material layer or the negative electrode active material layer) includes an electrode active material (a positive electrode active material or a negative electrode active material) and a binder formed of polyvinylidene fluoride (PVdF). Further, the electrode active material layer can include a conductive aid, an electrolyte solution, an ion conductive polymer, and the like, if necessary. In addition, in the present invention, the electrode active material may be configured to be coated with a coating agent including a coating resin, and a conductive aid.

Moreover, in the present specification, the electrode active material particle in the state of being coated with the coating agent is also referred to as a "coated electrode active material particle". The coated electrode active material particle has a core-shell structure in which a shell part formed of a coating resin, and if necessary, a coating agent including a conductive aid is formed on a surface of a core part formed of an electrode active material.

Positive Electrode Active Material

Examples of the positive electrode active material include a lithium-transition metal composite oxide such as $LiMn_2O_4$, $LiCoO_2$, $LiNiO_2$, $Li(Ni-Mn-Co)O_2$, or a compound in which some of these transition metals are replaced by other elements, a lithium-transition metal phosphate compound, a lithium-transition metal sulfate compound, and the like. Two or more positive electrode active materials may be used in combination in some cases. The lithium-transition metal composite oxide is preferably used as the positive electrode active material from the viewpoint of capacity and output characteristics. A composite oxide containing lithium and nickel is more preferably used. $Li(Ni-Mn-Co)O_2$ and a compound in which some of these transition metals are replaced by other elements (hereinafter also simply referred to as an "NMC composite oxide"), a lithium-nickel-cobalt-aluminum composite oxide (hereinafter also simply referred to as an "NCA composite oxide"), or the like is more preferably used. The NMC composite oxide has a layered crystal structure in which a lithium atom layer and a transition metal (Mn, Ni, and Co are orderly arranged) atomic layer are alternately laminated via an oxygen atom layer. In addition, one Li atom is included per atom of a transition metal M, and the amount of Li that can be taken out is twice that of a spinel-based lithium manganese oxide, that is, a supply capacity is doubled, and the capacity can thus be high.

As described above, the NMC composite oxide also includes composite oxides in which some of the transition metal elements are replaced by other elements. Examples of the other elements in this case include Ti, Zr, Nb, W, P, Al, Mg, V, Ca, Sr, Cr, Fe, B, Ga, In, Si, Mo, Y, Sn, V, Cu, Ag, Zn, and the like; Ti, Zr, Nb, W, P, Al, Mg, V, Ca, Sr, or Cr is preferable; Ti, Zr, P, Al, Mg, or Cr is more preferable; and Ti, Zr, Al, Mg, or Cr is even still more preferable from the viewpoint of improving the cycle characteristics.

Since the NMC composite oxide has a high theoretical discharge capacity, it preferably satisfies General Formula (1): $Li_aNi_bMn_cCo_dM_xO_2$ (in which a, b, c, d, and x satisfy $0.9 \leq a \leq 1.2$, $0<b<1$, $0<c \leq 0.5$, $0<d \leq 0.5$, $0 \leq x \leq 0.3$, and $b+c+d=1$; and M is at least one element selected from the group consisting of Ti, Zr, Nb, W, P, Al, Mg, V, Ca, Sr, and Cr). Here, a represents the atomic ratio of Li, b represents the atomic ratio of Ni, c represents the atomic ratio of Mn, d represents the atomic ratio of Co, and x represents the atomic ratio of M. In General Formula (1), $0.4 \leq b \leq 0.6$ is preferably satisfied from the viewpoint of cycle characteristics. In addition, the composition of each element can be measured by, for example, inductively coupled plasma (ICP) emission spectrometry.

In general, it is known that nickel (Ni), cobalt (Co), and manganese (Mn) contribute to capacity and output characteristics from the viewpoints of improving the purity of a material and improving the electron conductivity. Some of the transition metals in a crystal lattice are replaced by Ti and the like. Some of atoms of a transition metal element are preferably replaced by atoms of other elements from the viewpoint of cycle characteristics, and $0<x \leq 0.3$ is particularly preferably satisfied in General Formula (1). Due to the solid solution of at least one selected from the group consisting of Ti, Zr, Nb, W, P, Al, Mg, V, Ca, Sr, and Cr, the crystal structure is stabilized, and as a result, it is considered that reduction in capacity of the battery can be prevented even after repeated charge/discharge, and thus, excellent cycle characteristics can be achieved.

As a more preferable embodiment, in General Formula (1), b, c, and d preferably satisfy $0.44 \leq b \leq 0.51$, $0.27 \leq c \leq 0.31$, and $0.19 \leq d \leq 0.26$ from the viewpoint of improving a balance between the capacity and the life characteristics. For example, $LiNi_{0.5}Mn_{0.3}Co_{0.2}O_2$ has a larger capacity per unit weight than $LiCoO_2$, $LiMn_2O_4$, $LiNi_{1/3}Mn_{1/3}Co_{1/3}O_2$, or the like which has been proven to be satisfactory in a general consumer-use battery. This makes it possible to improve the energy density and brings about an advantage that a compact and high-capacity battery can be manufactured, and thus, it is preferable, also from the viewpoint of a cruising distance. $LiNi_{0.8}Co_{0.1}Al_{0.1}O_2$ is more advantageous in terms of larger capacity, but has a problem in the life characteristics. In contrast, $LiNi_{0.5}Mn_{0.3}Co_{0.2}O_2$ has excellent life characteristics similar to $LiNi_{1/3}Mn_{1/3}Co_{1/3}O_2$.

Incidentally, it is certain that a positive electrode active material other than the above-mentioned materials may be used. The average particle diameter of the positive electrode active material is not particularly limited, but is preferably 1 to 100 μm, and more preferably 1 to 20 μm from the viewpoint of a high output.

Negative Electrode Active Material

Examples of the negative electrode active material include a carbon material such as graphite, soft carbon, hard carbon, and the like, a lithium-transition metal composite oxide (for example, $Li_4Ti_5O_{12}$), a metal material (tin, silicon), a lithium alloy-based negative electrode material (for example, a lithium-tin alloy, a lithium-silicon alloy, a lithium-aluminum-manganese alloy, and the like), etc. In some cases, two or more kinds of the negative electrode active materials may be used in combination. Preferably, the carbon material, the lithium-transition metal composite oxide, or the lithium alloy-based negative electrode material is used preferably as the negative electrode active material from the viewpoint of the capacity and the output characteristics. The negative electrode active material other than the above materials can be used. In addition, the above-mentioned coating resin has a property of being easily attached to a carbon material. Therefore, it is preferable to use the carbon material as the negative electrode active material from the viewpoint of providing a structurally stable electrode material.

The average particle diameter of the negative electrode active material is not particularly limited, but is preferably 1 to 100 μm, and more preferably 1 to 20 μm from the viewpoint of a high output.

Conductive Aid

In the non-aqueous electrolyte secondary battery according to an embodiment of the present invention, it is preferable that the electrode active material layer further includes a conductive aid. The conductive aid has a function of forming an electron conductive path (conductive path) in the electrode active material layer. When such an electron conductive path is formed in the electrode active material layer, the internal resistance of the battery is reduced and thus, can contribute to improvement of the output characteristics at a high rate. In particular, it is preferable that at least a part of the conductive aid forms a conductive path electrically connecting two principal surfaces of the electrode active material layer (in the present embodiment, the first principal surface in contact with the electrolyte layer side of the electrode active material layer and the second principal surface in contact with the current collector side are electrically connected with each other). By having such a form, the electron transfer resistance in a thickness direction in the electrode active material layer is further reduced, so that the output characteristics at a high rate of the battery may be further improved. Furthermore, whether or not at least a part of the conductive aid forms a conductive path electrically connecting two principal surfaces of the electrode active material layer (in the present embodiment, the first principal surface in contact with the electrolyte layer side of the electrode active material layer and the second principal surface in contact with the current collector side are electrically connected with each other) can be confirmed by observing a cross-section of the electrode active material layer using an SEM or an optical microscope.

It is preferable that the conductive aid is a conductive fiber having a fibrous form from the viewpoint that it is secured to form such a conductive path. Specific examples of the conductive aid include a carbon fiber such as a PAN-based carbon fiber, a pitch-based carbon fiber, and the like; a conductive fiber obtained by uniformly dispersing a metal or graphite having good conductivity in a synthetic fiber; a metal fiber obtained by fibrillization of a metal such as stainless steel; a conductive fiber obtained by coating a surface of an organic fiber with a metal; a conductive fiber obtained by coating the surface of an organic fiber with a resin including a conductive material; and the like. Among those, the carbon fiber is preferable since it has excellent conductivity and light weight.

However, a conductive aid having no fibrous form may also be used. For example, a conductive aid having a particulate form (for example, a spherical from) can be used. In a case where the conductive aid is particulate, the shape of the particle is not particularly limited, and may be any shape of powdery, spherical, planar, columnar, amorphous, phosphatoid, and spindle-like shapes, and other shape. The average particle diameter (primary particle diameter) in a case where the conductive aid is particulate is not particularly limited, but is preferably approximately 0.01 to 10 μm from the viewpoint of electric characteristics of the battery. Furthermore, in the present specification, the "particle diameter" means the maximum distance L between two arbitrary points on the contour line of the conductive aid. As the value of the "average particle diameter", a value calculated as an average value of the particle diameters of the particles observed within several views to several tens views using an observation means such as a scanning electron microscope (SEM), a transmission electron microscope (TEM), and the like is intended to be adopted.

Examples of the conductive aid having a particulate form (for example, a spherical form) include metals such as aluminum, stainless steel (SUS), silver, gold, copper, titanium, and the like, and an alloy or metal oxide containing such metals; a carbon such as a carbon nanotube (CNT), carbon black (specifically acetylene black, Ketjen black (registered trademark), furnace black, channel black, thermal lamp black, and the like); etc., but are not limited thereto. In addition, a material obtained by coating a periphery of a particulate ceramic material or a resin material with the metal material by plating or the like can also be used as the conductive aid. Among those conductive aids, a material including at least one selected from the group consisting of aluminum, stainless steel, silver, gold, copper, titanium, and carbon is preferable, a material containing at least one selected from the group consisting of aluminum, stainless steel, silver, gold, and carbon is more preferable, and a material including at least one kind of carbon is still more preferable from the viewpoint of electrical stability. These conductive aids may be used alone or in combination of two or more kinds thereof.

The content of the conductive aid in the electrode active material layer is preferably 2 to 20% by mass with respect to 100% by mass of the total amount of the solid contents (a total solid content of all members) of the electrode active material layer. If the content of the conductive aid is within the range, there are advantages that the electron conductive path can be formed well in the electrode active material layer and a reduction in the energy density of the battery can also be suppressed.

As one preferred embodiment of the present invention, an aspect in which at least apart of the surface of the electrode active material is coated with a coating agent including a coating resin and a conductive aid may be mentioned. In such an aspect, the conductive aid included in the coating agent forms an electron conductive path in the coating agent and reduces the electron transfer resistance of the electrode active material layer, leading to contribution to an improvement of output characteristics at a high rate of the battery. The electrode active material coated with the coating agent is simply referred to as a "coated electrode active material". Hereinafter, specific configurations of such embodiments will be described with a focus on the coating agent.

Coating Agent

The coating agent includes a coating resin, and a conductive aid, as necessary. By allowing the coating agent to be present on the surface of the electrode active material, it is possible to secure an ion conductive path from the surface of the electrode active material to the electrolyte layer and an electron conductive path from the surface of the electrode active material to the current collector in the electrode active material layer.

Coating Resin

The coating resin exists on the surface of the electrode active material and has a function of absorbing and holding an electrolyte solution. Thus, an ion conductive path from the surface of the electrode active material to the electrolyte layer can be formed in the electrode active material layer.

In the bipolar secondary battery of the present aspect, a material of the coating resin is not particularly limited, but it is preferable that the material includes at least one selected from the group consisting of (A) a polyurethane resin and (B) a polyvinyl resin from the viewpoint of flexibility and liquid absorption.

(A) Polyurethane Resin

Since the polyurethane resin has high flexibility (high tensile elongation at break) and urethane bonds form a strong hydrogen bond mutually, it is possible to constitute a coating agent which has excellent flexibility and is structurally stable by using the polyurethane resin as a coating resin.

A specific form of the polyurethane resin is not particularly limited, and appropriate reference can be made to findings conventionally known about the polyurethane resin. The polyurethane resin may be composed of a polyisocyanate component (a1) and a polyol component (a2), and an ionic group introducing component (a3), an ionic group neutralizer component (a4), and a chain extender component (a5), as necessary, may be further used.

Examples of the polyisocyanate component (a1) include a diisocyanate compound having two isocyanate groups in one molecule and a polyisocyanate compound having three or more isocyanate groups in one molecule as. These may be used alone or in combination of two or more kinds thereof.

Examples of the diisocyanate compounds include aromatic diisocyanates such as 4,4'-diphenylmethane diisocyanate (MDI), 2,4- and/or 2,6-tolylene diisocyanate, p-phenylene diisocyanate, xylylene diisocyanate, 1,5-naphthalene diisocyanate, 3,3'-dimethyldiphenyl-4,4'-diisocyanate, dianisidine diisocyanate, tetramethylxylylene diisocyanate, and the like; alicyclic diisocyanates such as isophorone diisocyanate, dicyclohexylmethane-4,4'-diisocyanate, trans-1,4-cyclohexyl diisocyanate, norbornene diisocyanate, and the like; and aliphatic diisocyanates such as 1,6-hexamethylene diisocyanate, 2,2,4 and/or (2,4,4)-trimethylhexamethylene diisocyanate, lysine diisocyanate, and the like.

Such diisocyanate compound may be used in the form of a modified product from carbodiimide modification, isocyanurate modification, biuret modification, or the like, or may be used in the form of a blocked isocyanate blocked by various blocking agents.

Examples of the polyisocyanate compound having three or more isocyanate groups in one molecule include the above-exemplified isocyanurate trimers, biuret trimers, trimethylolpropane adducts of the diisocyanate, and the like; trifunctional or more isocyanate such as triphenylmethane triisocyanate, 1-methylbenzole-2,4,6-triisocyanate, dimethyl triphenylmethane tetraisocyanate, and the like; etc., and these isocyanate compounds may be used in the form of a modified product from carbodiimide modification, isocyanurate modification, biuret modification, or the like, or may be used in the form of a blocked isocyanate blocked by various blocking agents.

Examples of the polyol component (a2) includes a diol compound having two hydroxyl groups in one molecule and a polyol compound having three or more hydroxyl groups in one molecule, and these may be used alone or in combination of two or more kinds thereof.

Examples of the diol compound and the polyol compound having three or more hydroxyl groups in one molecule include low-molecular-weight polyols, polyether polyols, polyester polyols, polyester polycarbonate polyols, crystalline or amorphous polycarbonate polyols, polybutadiene polyols, and silicone polyols.

Examples of the low-molecular-weight polyols include aliphatic diols such as ethylene glycol, 1,2-propanediol, 1,3-propanediol, 2-methyl-1,3-propanediol, 2-butyl-2-ethyl-1,3-propanediol, 1,4-butanediol, neopentyl glycol, 3-methyl-2,4-pentanediol, 2,4-pentanediol, 1,5-pentanediol, 3-methyl-1,5-pentanediol, 2-methyl-2,4-pentanediol, 2,4-diethyl-1,5-pentanediol, 1,6-hexanediol, 1,7-heptanediol, 3,5-heptanediol, 1,8-octanediol, 2-methyl-1,8-octanediol, 1,9-nonanediol, 1,10-decanediol, and the like; alicyclic diols such as cyclohexanedimethanol, cyclohexanediol, and the like; and trihydric or higher polyols such as trimethylolethane, trimethylolpropane, hexitols, pentitols, glycerin, polyglycerin, pentaerythritol, dipentaerythritol, tetramethylolpropane, and the like.

Examples of the polyether polyols include ethylene oxide adducts such as diethylene glycol, triethylene glycol, tetraethylene glycol, polyethylene glycol, and the like; propylene oxide adducts such as dipropylene glycol, tripropylene glycol, tetrapropylene glycol, and polypropylene glycol; and polypropylene glycol; ethylene oxide and/or propylene oxide adducts of the low molecular weight polyols as described above; polytetramethylene glycol; and the like.

The polyester polyols include, for example, a polyester polyol obtained by direct esterification and/or ester-exchange reaction of a polyol such as the above low-molecular-weight polyols with a less than stoichiometric quantity of a polycarboxylic acid or an ester-forming derivative (ester, anhydride, halide, and the like) of the polycarboxylic acid and/or a lactone or a hydroxycarboxylic acid obtained by ring-opening hydrolysis of the lactone. The polycarboxylic acid or an ester-forming derivative thereof includes, for example, polycarboxylic acid such as aliphatic dicarboxylic acids such as oxalic acid, malonic acid, succinic acid, glutaric acid, adipic acid, pimelic acid, suberic acid, azelaic acid, sebacic acid, dodecanedioic acid, 2-methylsuccinic acid, 2-methyladipic acid, 3-methyladipic acid, 3-methylpentanedioic acid, 2-methyloctanedioic acid, 3,8-dimethyldecanedioic acid, 3,7-dimethyldecanedioic acid, hydrogenated dimer acid, and dimer acid; aromatic dicarboxylic acids such as phthalic acid, terephthalic acid, isophthalic acid, and naphthalenedicarboxylic acid; alicyclic dicarboxylic acids such as cyclohexanedicarboxylic acid; tricarboxylic acids such as trimellitic acid, trimesic acid, and trimer of castor oil fatty acid; and tetracarboxylic acids such as pyromellitic acid. The ester-forming derivatives of the polycarboxylic acids include anhydrides of the polycarboxylic acids, halides such as chlorides and bromides of the polycarboxylic acids, lower aliphatic esters such as methyl, ethyl, propyl, isopropyl, butyl, isobutyl, and amyl esters of the polycarboxylic acids. The lactones include γ-caprolactone, δ-caprolactone, ε-caprolactone, dimethyl-ε-caprolactone, δ-valerolactone, γ-valerolactone, γ-butyrolactone, and the like.

Examples of the ionic group introducing component (a3) used as necessary include an anionic group introducing component and a cationic group introducing component. Examples of the anionic group introducing component include carboxyl group-containing polyols such as dimethylolpropionic acid, dimethylolbutanoic acid, dimethylolbutyric acid, dimethylolvaleric acid, and the like; and sulfonic acid group-containing polyols such as 1,4-butanediol-2-sulfonic acid and the like, and examples of the cationic group introducing component include N,N-dialkylalkanolamines, N-alkyl-N,N-dialkanolamines such as N-methyl-N,N-diethanolamine, N-butyl-N,N-diethanolamine, and the like, and trialkanolamines.

Examples of the ionic group neutralizer component (a4) include tertiary amine compounds including trialkylamines such as trimethylamine, triethylamine, tributylamine, and the like, N,N-dialkylalkanolamines such as N,N-dimethylethanolamine, N,N-dimethylpropanolamine, N,N-dipropylethanolamine 1-dimethylamino-2-methyl-2-propanol, and the like, N-alkyl-N,N-dialkanolamines, trialkanolamines such as triethanolamine and the like, etc.; and basic compounds such as ammonia, trimethylammonium hydroxide, sodium hydroxide, potassium hydroxide, lithium hydroxide, and the like, and examples of the ionic group neutralizer include organic carboxylic acids such as formic acid, acetic acid, lactic acid, succinic acid, glutaric acid, citric acid, and the like; organic sulfonic acids such as para-toluenesulfonic acid, alkyl sulfonate, and the like; inorganic acids such as hydrochloric acid, phosphoric acid, nitric acid, sulfuric acid, and the like; epoxy compounds such as epihalohydrin and the like; and quaternizing agents such as dialkyl sulfate, alkyl halide, and the like.

As the chain extender component (a5) used as necessary, well-known chain extenders may be used alone or in combination of two or more kinds thereof, and a diamine compound, a polyhydric primary alcohol, or the like is preferable, and a polyhydric amine compound is more preferable. Examples of the polyhydric amine compound include low-molecular-weight diamines such as ethylenediamine, propylenediamine, and the like, with a structure in which alcoholic hydroxyl groups of the above-exemplified low-molecular-weight diols are substituted with amino groups; polyetherdiamines such as polyoxypropylenediamine, polyoxyethylenediamine, and the like; alicyclic diamines such as menthenediamine, isophoronediamine, norbornenediamine, bis(4-amino-3-methyldicyclohexyl) methane, diaminodicyclohexylmethane, bis(amino-methyl) cyclohexane, 3,9-bis(3-aminopropyl)-2,4,8,10-tetraoxaspiro (5,5)undecane, and the like; aromatic diamines such as m-xylenediamine, α-(m/p-aminophenyl)ethylamine, m-phenylenediamine, diaminodiphenylmethane, diaminodiphenylsulfone, diaminodiethyldimethyldiphenylmethane, diaminodiethyldiphenylmethane, dimethylthiotoluenediamine, diethyltoluenediamine, α,α'-bis(4-aminophenyl)-p-diisopropylbenzene, and the like; hydrazine; and dicarboxylic acid dihydrazide compounds which are compounds with dicarboxylic acid and hydrazine, exemplified as a polycarboxylic acid used for the polyester polyols.

Among the respective components as described above, as the polyisocyanate component (a1), a diisocyanate compound is preferably used, 4,4'-diphenylmethanediisocyanate (MDI), 2,4'-diphenylmethane diisocyanate, 4,4'-dicyclohexyl methane diisocyanate, 1,4-cyclohexane diisocyanate, 2,4-toluene diisocyanate, 1,6-hexamethylene diisocyanate, or the like is particularly preferably used, and 4,4'-diphenylmethane diisocyanate (MDI) is most preferably used. Furthermore, as the polyol component (a2), an ethylene oxide adduct which is a diol compound is preferably used as an essential component, and polyethylene glycol is particularly preferably used as an essential component. Since polyethylene glycol has excellent lithium ion conductivity, such a configuration makes it possible to remarkably exhibit an effect of lowering (suppressing an increase in) internal resistance of the battery. Here, a number average molecular weight calculated from a hydroxyl value of polyethylene glycol is not particularly limited, but is preferably 2,500 to 15,000, more preferably 3,000 to 13,000, and still more preferably 3,500 to 10,000. Incidentally, it is preferable to further use ethylene glycol and/or glycerin as a polyol component in addition to the above-described essential components from the viewpoint of excellent heat resistance. In particular, if only ethylene glycol is used while not using glycerin, a gel obtained by swelling of the coating resin is a physically crosslinked gel, and therefore, it can be dissolved in a solvent in the preparation and various production methods as described later can be applied. On the other hand, if glycerin is used in addition to ethylene glycol, the main chains of a polyurethane resin are chemically crosslinked with each other, and in this case, there is an advantage that a degree of swelling to an electrolyte solution can be arbitrarily controlled by controlling a molecular weight between the crosslinks.

In addition, a method for synthesizing the polyurethane resin is not particularly limited and appropriate reference can be made to findings conventionally known.

(B) Polyvinyl-Based Resin

Since the polyvinyl resin has high flexibility (high tensile elongation at break as described later), it is possible to mitigate a volume change of the active material accompanying the charging and discharging reaction and suppress the expansion of the active material layer by using the polyvinyl resin as a coating resin.

A specific form of the polyvinyl resin is not particularly limited, and appropriate reference can be made to findings conventionally known as long as the polyurethane resin is a polymer obtained by polymerization of monomers including a polymerizable unsaturated bond (hereinafter also referred to as a "vinyl monomer").

In particular, as the vinyl monomer, a vinyl monomer (b1) having a carboxy group and a vinyl monomer (b2) represented by the following formula (1) are preferably included.

[Chem. 1]

$$CH_2=C(R^1)COOR^2 \qquad (1)$$

In Formula (1), $R^1$ is a hydrogen atom or a methyl group, and $R^2$ is a linear alkyl group having 1 to 4 carbon atoms or a branched alkyl group having 4 to 36 carbon atoms.

The vinyl monomer (b1) having a carboxyl group is a monocarboxylic acid having 3 to 15 carbon atoms, such as methacrylic acid, crotonic acid, cinnamic acid, and the like; a dicarboxylic acid having 4 to 24 carbon atoms, such as maleic acid (anhydride), fumaric acid (anhydride), itaconic acid (anhydride), citraconic acid, mesaconic acid, and the like; a tri- or tetravalent or higher polycarboxylic acid having 6 to 24 carbon atoms, such as aconitic acid and the like; etc. Among those, the (meth)acrylic acid is preferable, and methacrylic acid is particularly preferable.

In the vinyl monomer (b2) represented by General Formula (1), $R^1$ represents a hydrogen atom or a methyl group. $R^1$ is preferably the methyl group.

$R^2$ is a linear alkyl group having 1 to 4 carbon atoms or a branched alkyl group having 4 to 36 carbon atoms, and Specific examples of $R^2$ include a methyl group, an ethyl group, a propyl group, a 1-alkylalkyl group (a 1-methylpropyl group (sec-butyl group), a 1,1-dimethylethyl group (tert-butyl group), a 1-methylbutyl group, a 1-ethylpropyl group, a 1,1-dimethylpropyl group, a 1-methylpentyl group, a 1-ethylbutyl group, a 1-methylhexyl group, a 1-ethylpentyl group, a 1-methylheptyl group, a 1-ethylhexyl group, a 1-methyloctyl group, a 1-ethylheptyl group, a 1-methylnonyl group, a 1-ethyloctyl group, a 1-methyldecyl group, a 1-ethyl nonyl group, a 1-butyl eicosyl group, a 1-hexyloctadecyl group, a 1-octylhexadecyl group, a 1-decyltetradecyl group, a 1-undecyltridecyl group, and the like), a 2-alkylalkyl group (a 2-methylpropyl group (iso-butyl group), a 2-methylbutyl group, a 2-ethylpropyl group, a 2,2-dimethylpropyl group, a 2-methylpentyl group, a 2-ethylbutyl group, a 2-methylhexyl group, a 2-ethylpentyl group, a 2-methylheptyl group, a 2-ethylhexyl group, a 2-methyloctyl group, a 2-ethylheptyl group, a 2-methylnonyl group, a 2-ethyloctyl group, a 2-methyldecyl group, a 2-ethylnonyl group, a 2-hexyloctadecyl group, a 2-octylhexadecyl group, a 2-decyltetradecyl group, a 2-undecyltridecyl group, a 2-dodecylhexadecyl group, a 2-tridecylpentadecyl group, a 2-decyloctadecyl group, a 2-tetradecyloctadecyl group, a 2-hexadecyloctadecyl group, a 2-tetradecyleicosyl group, a 2-hexadecyleicosyl group, or the like), 3- to 34-alkylalkyl groups (a 3-alkylalkyl group, a 4-alkylalkyl group, a 5-alkylalkyl group, a 32-alkylalkyl group, a 33-alkylalkyl group, a 34-alkylalkyl group, and the like); mixed alkyl groups containing one or more branched alkyl groups such as residues of oxo alcohols produced corresponding to propylene oligomers (from heptamers to undecamers), ethylene/propylene (molar ratio of 16/1 to 1/11) oligomers, isobutylene oligomers (from heptamers to octamers), α-olefin (having 5 to 20 carbon atoms) oligomers (from tetramers to octamers), or the like; etc.

Among those, from the viewpoint of liquid absorption of an electrolyte solution, the methyl group, the ethyl group, or the 2-alkylalkyl group is preferable, and the 2-ethylhexyl group and the 2-decyltetradecyl group are more preferable.

Moreover, the monomers constituting the polymer may also include a copolymerizable vinyl monomer (b3) containing no active hydrogen, in addition to the vinyl monomer (b1) having a carboxyl group and the vinyl monomer (b2) represented by the formula (1) above.

Examples of the copolymerizable vinyl monomer (b3) containing no active hydrogen include the following (b31) to (b35).

(b31) Hydrocarbyl (Meth)Acrylate Formed from Monools Having 1 to 20 Carbon Atoms and (Meth)Acrylic acid Examples of the monool include (i) aliphatic monools [methanol, ethanol, n- or i-propyl alcohol, n-butyl alcohol, n-pentyl alcohol, n-octyl alcohol, nonyl alcohol, decyl alcohol, lauryl alcohol, tridecyl alcohol, myristyl alcohol, cetyl alcohol, stearyl alcohol, and the like]; (ii) alicyclic monools [cyclohexyl alcohol and the like]; (iii) araliphatic monools [benzyl alcohol, and the like]; and mixtures of two or more thereof.

(b32) Poly(n=2 to 30)Oxyalkylene (Having 2 to 4 Carbon Atoms) Alkyl (Having 1 to 18 Carbon Atoms) Ether (Meth)Acrylates [(meth)acrylate of ethylene oxide (hereinafter abbreviated as EO) (10 mol) adduct of methanol, (meth)acrylate of propylene oxide (hereinafter abbreviated as PO) (10 mol) adduct of methanol, and the like]

(b33) Nitrogen-Containing Vinyl Compounds (b33-1) Amide Group-Containing Vinyl Compounds (i) (Meth)acrylamide compounds having 3 to 30 carbon atoms, for example, N,N-dialkyl (having 1 to 6 carbon atoms) or diaralkyl (having 7 to 15 carbon atoms) (meth)acrylamides [N,N-dimethylacrylamide, N,N-dibenzylacrylamide, and the like], and diacetone acrylamide (ii) Amide group-containing vinyl compounds having 4 to 20 carbon atoms excluding the above (meth)acrylamide compounds, for example, N-methyl-N-vinylacetamide, cyclic amides (pyrrolidone compounds (having 6 to 13 carbon atoms, for example, N-vinyl pyrrolidone and the like)).

(b33-2) (Meth)Acrylate Compounds (i) Dialkyl (having 1 to 4 carbon atoms) aminoalkyl (having 1 to 4 carbon atoms) (meth)acrylates [N,N-dimethylaminoethyl (meth)acrylate, N,N-diethylaminoethyl (meth)acrylate, t-butylaminoethyl (meth)acrylate, morpholinoethyl (meth)acrylate, and the like]

(ii) Quaternary ammonium group-containing (meth)acrylates [quaternary compounds obtained by quaternizing tertiary amino group-containing (meth)acrylates [N,N-dimethylaminoethyl (meth)acrylate, N,N-diethylaminoethyl (meth)acrylate, and the like] with a quaternizing agent (a quaternary product obtained by using the quaternizing agent), and the like]

(b33-3) Heterocyclic Ring-Containing Vinyl Compounds

Pyridine compounds (having 7 to 14 carbon atoms, for example, 2- or 4-vinyl pyridine), imidazole compounds (having 5 to 12 carbon atoms, for example, N-vinyl imidazole), pyrrole compounds (having 6 to 13 carbon atoms, for example, N-vinyl pyrrole), and pyrrolidone compounds (having 6 to 13 carbon atoms, for example, N-vinyl-2-pyrrolidone)

(b33-4) Nitrile Group-Containing Vinyl Compounds

Nitrile group-containing vinyl compounds having 3 to 15 carbon atoms, for example, (meth)acrylonitrile, cyanostyrene, and cyanoalkyl (having 1 to 4 carbon atoms) acrylate (b33-5) Other Nitrogen-Containing Vinyl Compounds Nitro group-containing vinyl compounds (having 8 to 16 carbon atoms, for example, nitrostyrene) and the like (b34) Vinyl Hydrocarbons (b34-1) Aliphatic Vinyl Hydrocarbons Olefins having 2 to 18 carbon atoms or more [ethylene, propylene, butene, isobutylene, pentene, heptene, diisobutylene, octene, dodecene, octadecene, and the like], dienes having 4 to 10 carbon atoms or more [butadiene, isoprene, 1,4-pentadiene, 1,5-hexadiene, 1,7-octadiene, and the like], and the like (b34-2) Alicyclic Vinyl Hydrocarbons Cyclic unsaturated compounds having 4 to 18 carbon atoms or more, for example, cycloalkene (for example, cyclohexene), (di)cycloalkadiene [for example, (di)cyclopentadiene], and terpene (for example, pinene, limonene, and indene)

(b34-3) Aromatic Vinyl Hydrocarbons

Aromatic unsaturated compounds having 8 to 20 carbon atoms or more, for example, styrene, α-methyl styrene, vinyl toluene, 2,4-dimethyl styrene, ethyl styrene, isopropyl styrene, butyl styrene, phenyl styrene, cyclohexyl styrene, and benzyl styrene (b35) Vinyl Esters, Vinyl Ethers, Vinyl Ketones, and Unsaturated Dicarboxylic Acid Diesters (b35-1) Vinyl Esters Aliphatic vinyl esters [having 4 to 15 carbon atoms, for example, alkenyl esters of aliphatic carboxylic acid (mono- or dicarboxylic acid) (for example, vinyl acetate, vinyl propionate, vinyl butyrate, diallyl adipate, isopropenyl acetate, and vinyl methoxy acetate)], aromatic vinyl esters [having 9 to 20 carbon atoms, for example, alkenyl esters of aromatic carboxylic acid (mono- or dicarboxylic acid) (for example, vinyl benzoate, diallyl phthalate, methyl-4-vinyl benzoate), and aromatic ring-containing esters of aliphatic carboxylic acid (for example, acetoxystyrene)]

(b35-2) Vinyl Ethers

Aliphatic vinyl ethers [having 3 to 15 carbon atoms, for example, vinyl alkyl (having 1 to 10 carbon atoms) ether (vinyl methyl ether, vinyl butyl ether, vinyl 2-ethylhexyl ether, and the like), vinyl alkoxy (having 1 to 6 carbon atoms) alkyl (having 1 to 4 carbon atoms) ethers (vinyl-2-methoxyethyl ether, methoxybutadiene, 3,4-dihydro-1,2-pyran, 2-butoxy-2'-vinyloxy diethyl ether, vinyl-2-ethylmercapto ethyl ether, and the like), and poly(2 to 4) (meth) allyloxyalkane (having 2 to 6 carbon atoms) (diallyloxyethane, triallyloxyethane, tetraallyloxybutane, and tetramethallyloxyethane, and the like)]

Aromatic vinyl ethers (having 8 to 20 carbon atoms, for example, vinyl phenyl ether and phenoxystyrene)

(b35-3) Vinyl Ketones

Aliphatic vinyl ketones (having 4 to 25 carbon atoms, for example, vinyl methyl ketone and vinyl ethyl ketone), aromatic vinyl ketones (having 9 to 21 carbon atoms, for example, vinyl phenyl ketone)

(b35-4) Unsaturated Dicarboxylic Acid Diesters

Unsaturated dicarboxylic acid diesters having 4 to 34 carbon atoms, for example, dialkyl fumarate (two alkyl groups are each a linear, branched, or alicyclic group having 1 to 22 carbon atoms) and dialkyl maleate (two alkyl groups are each a linear, branched, or alicyclic group having 1 to 22 carbon atoms)

Among those exemplified above as the monomer (b3), from the viewpoints of liquid absorption of the electrolyte solution and voltage resistance, (b31), (b32), and (b33) are preferable, and methyl (meth)acrylate, ethyl (meth)acrylate, and butyl (meth)acrylate among (b31) are more preferable.

In the polymer, the contents of the vinyl monomer (b1) having a carboxyl group, the vinyl monomer (b2) represented by General Formula (1), and the copolymerizable vinyl monomer (b3) containing no active hydrogen are preferably 0.1 to 80% by mass of (b1), 0.1 to 99.9% by mass of (b2), and 0 to 99.8% by mass of (b3), with respect to the weight of the polymer.

If the content of these monomers is within the above ranges, the liquid absorption property for an electrolyte solution is improved.

The contents of (b1) to (b3) are more preferably 30 to 60% by mass of (b1), 5 to 60% by mass of (b2), and 5 to 80% by mass of (b3), and still more preferably 35 to 50% by mass of (b1), 15 to 45% by mass of (b2), and 20 to 60% by mass of (b3).

A lower limit of the number average molecular weight of the polymer is preferably 10,000, more preferably 15,000, particularly preferably 20,000, and most preferably 30,000, and an upper limit thereof is preferably 2,000,000, more preferably 1,500,000, particularly preferably 1,000,000, and most preferably 800,000.

The number average molecular weight of the polymer can be determined by GPC (gel permeation chromatography) under the following conditions.

Device: Alliance GPC V2000 (manufactured by Waters)
Solvent: Ortho-Dichlorobenzene
Standard substance: Polystyrene
Sample concentration: 3 mg/ml
Column solid phase: Two PL gel 10 μm MIXED-B columns connected in series (manufactured by Polymer Laboratories Limited)
Column temperature: 135° C.

The solubility parameter (SP value) of the polymer is preferably 9.0 to 20.0 $(cal/cm^3)^{1/2}$. The SP value of the polymer is more preferably 9.5 to 18.0 $(cal/cm^3)^{1/2}$, and still more preferably 10.0 to 14.0 $(cal/cm^3)^{1/2}$. The polymer having an SP value of 9.0 to 20.0 $(cal/cm^3)$ lie is preferred in terms of liquid absorption of the electrolyte solution.

Furthermore, the glass transition point [hereinafter abbreviated as Tg; measurement method: DSC (differential scanning calorimetry] of the polymer is preferably 80 to 200° C., more preferably 90 to 190° C., and particularly preferably 100 to 180° C., from the viewpoint of the heat resistance of the battery.

The polymer can be produced by a known polymerization method (bulk polymerization, solution polymerization, emulsion polymerization, suspension polymerization, or the like)

The coating resin preferably has moderate flexibility in a state of being immersed in an electrolyte solution. Specifically, the tensile elongation at break of the coating resin in a saturated liquid absorbing state is preferably 10% or more, more preferably 20% or more, still more preferably 30% or more, particularly preferably 40% or more, and most preferably 50% or more. By coating the electrode active material with a resin having a tensile elongation at break of 10% or more, it is possible to relax a volume change of the electrode active material due to a charging and discharging reaction and to suppress expansion of the electrode. Incidentally, in the present specification, the "tensile elongation at break" is an index indicating flexibility of a resin and is a value obtained by a measuring method described in the column of Examples described later. A larger value of the tensile elongation at break of the coating resin is more preferable. An upper limit value thereof is not particularly limited, but is usually 400% or less, and preferably 300% or less. That is, a preferable range of the numerical values of the tensile elongation at break is 10 to 400%, 20 to 400%, 30 to 400%, 40 to 400%, 50 to 400%, 10 to 300%, 20 to 300%, 30 to 300%, 40 to 300%, or 50 to 300%.

Examples of a method for imparting flexibility to the coating resin and controlling the tensile elongation at break to a desired value include a method for introducing a flexible partial structure (for example, a long chain alkyl group, a polyether residue, an alkyl polycarbonate residue, an alkyl polyester residue, or the like) into the main chain of the coating resin. In addition, it is possible to adjust the tensile elongation at break by imparting flexibility to the coating resin by controlling the molecular weight of the coating resin or controlling a molecular weight between the cross-links.

In the present embodiment, the contents of the coating resin and the conductive aid are not particularly limited, but the coating resin (resin solid content):the conductive aid is preferably 1:0.2 to 3.0 (mass ratio). Within such a range, the conductive aid can form an electron conductive path well in the coating agent. The coating amount with the coating agent is not particularly limited, but is preferably 1 to 10% by mass, more preferably 2 to 8% by mass, and still more preferably 3 to 7% by mass, with respect to 100% by mass of the positive electrode active material. On the other hand, the coating amount with the coating agent is preferably 0.1 to 15% by mass, more preferably 0.3 to 13% by mass, and still more preferably 0.5 to 12% by mass with respect to 100% by mass of the negative electrode active material.

Method for Producing Coated Electrode Active Material

A method for producing the coated electrode active material is not particularly limited, but examples thereof include the following methods. First, an electrode active material is added to a universal mixer and stirred at 10 to 500 rpm, and in the same state, a solution (resin solution for coating) including a coating resin and a solvent is added dropwise and mixed over 1 to 90 minutes. As the solvent herein, alcohols such as methanol, ethanol, isopropanol, and the like can be suitably used. Thereafter, a conductive aid is further added thereto and mixed. Furthermore, the temperature is increased to 50 to 200° C. under stirring, and the pressure is lowered to 0.007 to 0.04 MPa and maintained as it is for 10 to 150 minutes, which makes it possible to obtain a coated electrode active material particle.

In the present embodiment, the content of the conductive aid included in the electrode active material layer other than the conductive aid included in the coating agent is preferably 1 to 20% by mass, and more preferably 2 to 15% by mass, with respect to with respect to 100% by mass of the total solid content (total solid content of all members). If the content of the conductive aid other than that included in the coating agent is within the range described above, the electron conductive path can be formed well in the electrode active material layer, and deterioration of the energy density of the battery can be suppressed.

Ion Conductive Polymer

Examples of the ion conductive polymer include a polyethylene oxide (PEO)-based polymer and a polypropylene oxide (PPO)-based polymer.

Electrolyte Solution

In the non-aqueous electrolyte secondary battery according to one aspect of the present invention, it is preferable that the electrode active material layer further include an electrolyte solution. For example, when the electrode active material layer is produced by a method which will be described later, the electrolyte solution can be included in the electrode active material layer. Since the electrolyte solution included in the layer can be used as an electrolyte solution for a battery, it is not necessary to remove the electrolyte solution.

As the solvent constituting the electrolyte solution, a mixed solvent of EC and PC or a mixed solvent of EC and DEC is preferable. In this case, the mixing ratio (volume ratio) of EC and PC or DEC is preferably 3:7 to 7:3, more preferably 2:3 to 3:2, and still more preferably about 1:1.

Moreover, examples of a lithium salt (support salt) included in the electrolyte solution include lithium salts of inorganic acids, such as $LiPF_6$, $LiBF_4$, $LiSbF_6$, $LiAsF_6$ $LiClO_4$, $Li[(FSO_2)_2N](LiFSI)$, and the like; lithium salts of organic acids, such as $LiN(CF_3SO_2)_2$, $LiN(C_2F_5SO_2)_2$, $LiC(CF_3SO_2)_3$, and the like; etc. Among those, $LiPF_6$ or $Li[(FSO_2)_2N](LiFSI)$ is preferable in terms of the battery output and the charge/discharge cycle characteristics.

Binder

Furthermore, in the bipolar secondary battery of the present aspect, members other than the electrode active material, or the coating agent (the coating resin and the conductive aid), the electrolyte solution, and the ion conductive polymer, used as necessary, as described above, may appropriately be used as a member constituting the electrode active material layer. Here, from the viewpoint of improving the energy density of the battery, it is preferable that a member not contributing much to the progress of the charging and discharging reaction is not included in the electrode active material layer. For example, the content of the binder added to bind the electrode active material and the other members to maintain the structure of the electrode active material layer is preferably small from the viewpoint of improving the volume energy density. Further, in a case when the content of a binder becomes large, there is a risk that the discharge capacity at a high rate will be lowered. However, according to the studies conducted by the present inventors, it was found that, if a binder formed of polyvinylidene fluoride (PVdF) is contained in a prescribed amount in a non-crystallized state, the problem of the present invention can be solved from the viewpoint of retaining the shape and improving the cycle durability of the battery. Specifically, it was found that, when the electrode active material layer includes the binder in a non-crystallized state in the amount of 0.5 to 3.3% by volume, preferably 1.0 to 2.5% by volume, and more preferably 1.5 to 2.0% by volume, with respect to the total volume of the electrode active material layer, the problem of the present invention can be solved. When the binder formed of polyvinylidene fluoride (PVdF) is contained in an amount of 0.5% by volume or more, there is an advantage that the electrode active material layer can be effectively suppressed from being collapsed even if the value of the liquid volume coefficient of the battery is increased, as compared with a case where the binder is hardly included or not included at all. In other words, if the value of the liquid volume coefficient of the battery is simply increased if the binder is hardly included or not included at all, the shape of the electrode active material layer cannot be maintained and the electrode active material layer is collapsed. Further, when the binder formed of polyvinylidene fluoride (PVdF) is contained in an amount of 3.3% by volume or less, it is possible to retain the shape of the electrode active material layer without adversely affecting the discharge capacity at a high rate.

Here, the "liquid volume coefficient" is a ratio of the volume of the electrolyte solution injected into the battery to the volume of the electrolyte solution that can be absorbed by the power generating element, and the larger the value, the less likely the shortage of the electrolyte solution occurs, which contributes to improvement of the capacity characteristics of the battery, and the like. For example, the liquid volume coefficient of a battery manufactured by injecting the electrolyte solution to the exact degree to be absorbed by the power generating element is 1, and the value of the liquid volume coefficient becomes larger as the volume of the electrolyte solution to be injected is larger than the volume of the electrolyte solution to the exact degree to be absorbed by the power generating element. In the present aspect, it is possible to increase the liquid volume coefficient while maintaining the shape of the electrode active material layer as described above. Accordingly, the value of the liquid volume coefficient in the present aspect is 1.4 or more, more preferably 1.40 or more, and more preferably 1.5 or more. On the other hand, the upper limit value of the values of the liquid volume coefficient is not particularly limited, but usually, it may be approximately 2.0 or less.

The weight average molecular weight (Mw) of polyvinylidene fluoride (PVdF) is preferably 50,000 to 1,000,000 and from the viewpoint of further improving the effect of the present invention, it is more preferably 100,000 to 500,000, and still more preferably 300,000 to 400,000. In addition, in the present specification, as the value of Mw of polyvinylidene fluoride (PVdF), a value measured by gel permeation chromatography (GPC) using polystyrene as a standard substance is adopted.

The positive electrode active material layer and the negative electrode active material layer may include other binders other than the binder formed of polyvinylidene fluoride (PVdF). As the binder with arbitrary components for use in the electrode active material layer, a binder capable of holding an electrode structure by allowing the constituent members in the active material layer to bind each other or by allowing the active material layer to bind the current collector can be used. As other binders, for example, fluorine-based resins or rubbers, such as a fluorine-based resin such as a copolymer of tetrafluoroethylene (TFE) and PVdF, polytetrafluoroethylene (PTFE), a tetrafluoroethylene-hexafluoroethylene copolymer (FEP), a tetrafluoroethylene-perfluoroalkyl vinyl ether copolymer (PFA), an ethylene-tetrafluoroethylene copolymer (ETFE), a polychlorotrifluoroethylene (PCTFE), an ethylene-tetrafluoroethylene copolymer (ECTFE), polyvinyl chloride (PVF), and the like; or a vinylidene fluoride-based fluorine rubber such as a vinylidene fluoride-hexafluoropropylene-based fluorine resin (VdF-HFP-based fluorine rubber), a vinylidene fluoride-hexafluoropropylene-tetrafluoroethylene-based fluorine resin (VdF-HFP-TFE-based fluorine rubber), a vinylidene fluoride-pentafluoropropylene-based fluorine resin (VdF-PFP-based fluorine rubber), a vinylidene fluoride-pentafluoropropylene-tetrafluoroethylene-based fluorine resin (VdF-PFP-TFE-based fluorine rubber), a vinylidene fluoride-perfluoromethylvinyl ether-tetrafluoroethylene-based fluorine resin (VdF-PFMVE-TFE-based fluorine rubber), a vinylidene fluoride-chlorotrifluoroethylene-based fluorine resin (VdF-CTFE-based fluorine rubber), and the like can be used. In addition to those, other examples of the binder include at least one selected from the group consisting of polybutylene terephthalate, polyethylene terephthalate, polyethylene, polypropylene, polymethylpentene, and polybutene, a compound in which a hydrogen atom of polyvinylidene fluoride (PVdF) is substituted with another halogen element; thermoplastic polymers such as polyether nitrile, polyacrylonitrile, polyimide, polyamide, an ethylene-vinyl acetate copolymer, polyvinyl chloride, a styrene-butadiene rubber (SBR), an ethylene-propylene block copolymer, a styrene-butadiene block copolymer and a hydrogenated product thereof, and a styrene-isoprene-styrene block copolymer and a hydrogenated product thereof, and the like, an epoxy resin, etc. Alternatively, an aqueous binder such as the styrene-butadiene rubber (SBR) and the like may be used alone or in combination with a thickener such as carboxymethyl cellulose (CMC) and the like as such other binders. In addition, such other binders may be used alone or in combination of two or more kinds thereof.

However, it is preferable that the content of the binder component in the active material layer is smaller from the viewpoint of the volume energy density, as described above. Accordingly, it is preferable that the main component of the binder component included in the active material layer is a binder formed of the polyvinylidene fluoride (PVdF) (in a non-crystallized state). Specifically, the content of the binder formed of polyvinylidene fluoride (PVdF) is preferably 50% by mass or more, more preferably 80% by mass or more, and still more preferably 90% by mass or more, particularly preferably 95% by mass or more, and most preferably 100% by mass, with respect to 100% by mass binder component included in the active material layer.

Furthermore, in a case where the binder is included in the electrode active material layer, it is preferable that the binder is formed of a material having low flexibility from the viewpoint of holding the structure of the electrode active material layer. Specifically, it is preferable that the tensile elongation at break of the binder in the saturated liquid absorption state is less than 10%, more preferably 7% or less, still more preferably 5% or less, particularly preferably 3% or less, and most preferably 1% or less.

With regard to the thickness of the electrode active material layer in the bipolar secondary battery of the present aspect, the thickness of the positive electrode active material layer is 150 to 1,500 μm, more preferably 180 to 950 μm, and more preferably 200 to 800 μm. Furthermore, the thickness of the negative electrode active material layer is preferably 150 to 1,500 μm, more preferably 180 to 1,200 μm, and still more preferably 200 to 1,000 μm. If the thickness of the electrode active material layer is a value equal to or more than the above-mentioned lower limit value, it is possible to sufficiently enhance the energy density of a battery. On the other hand, if the thickness of the electrode active material layer is a value equal to or less than the above-mentioned upper limit value, it is possible to sufficiently hold the structure of the electrode active material layer.

With regard to the porosity of the electrode active material layer, the porosity of the positive electrode active material layer is preferably 35 to 50%, more preferably 40 to 49.5%, and still more preferably 42 to 49%. The porosity of the negative electrode active material layer is preferably 35 to 60%, more preferably 38 to 55%, and still more preferably 40 to 50%. If the porosity of the electrode active material layer is equal to or more than the lower limit value, it is not necessary to increase the pressing pressure when the coating film is pressed after coating a slurry for an electrode active material layer in the formation of the electrode active material layer. As a result, it is possible to suitably form the electrode active material layer having desired thickness and area. On the other hand, if the porosity of the electrode active material layer is equal to or less than the upper limit value, it is possible to sufficiently maintain a contact between the electron conductive materials (a conductive aid, an electrode active material, and the like), thereby preventing an increase in the electron transfer resistance. As a result, a charging and discharging reaction can be uniformly advanced in the entire electrode active material layer (in particular, in the thickness direction), and reduction in output characteristics of a battery (in particular, output characteristics at a high rate) can be prevented. In addition, in the present specification, the porosity of the electrode active material layer can be measured by the following method. If the same value can be obtained, a value measured by another method may be used.

Method for Measuring Porosity of Electrode Active Material Layer

The porosity of the electrode active material layer is calculated according to the following Equation (1). Further, the electrolyte solution may exist in some of the pores.

Porosity (%)=100−Volume ratio (%)occupied by solid content of electrode active material layer  Equation (1):

Here, the "volume ratio (%) occupied by solid content" of the electrode active material layer is calculated from the following Equation (2).

Volume ratio (%) occupied by solid content=(Volume($cm^3$) of solid material/Volume($cm^3$) of electrode active material layer)×100  Equation (2):

In addition, the volume of the electrode active material layer is calculated from the thickness of the electrode and the coating area. Incidentally, the volume of the solid material is determined by the following procedure.

(a) The addition amounts of the respective materials included in the slurry for an electrode active material layer are weighed.

(b) The slurry for an electrode active material layer is applied onto the surface of a current collector, and then the weight of the current collector and the coating film are weighed.

(c) The slurry after application is pressed and the weight of the current collector and the coating film after pressing are weighed.

(d) The amount of the electrolyte solution sucked out at the time of pressing is calculated from "Value obtained by (c)−Value obtained by (b)".

(e) The weights of the respective materials in the electrode active material layer after pressing are calculated from the values of (a), (c), and (d).

(f) The volumes of the respective materials in the electrode active material layer are calculated from the weights of the respective materials calculated by (e) and the densities of the respective materials.

(g) The volume of the solid materials is calculated by adding up only the volumes of the solid materials among the volumes of the respective materials calculated by (f).

Moreover, with regard to the density of the electrode active material layer, the density of the positive electrode active material layer is preferably 2.10 to 3.00 g/$cm^3$, more preferably 2.15 to 2.85 g/$cm^3$, and still more preferably 2.20 to 2.80 g/$cm^3$. In addition, the density of the negative electrode active material layer is preferably 0.60 to 1.30 g/$cm^3$, more preferably 0.70 to 1.20 g/$cm^3$, and still more preferably 0.80 to 1.10 g/$cm^3$. A battery having a sufficient energy density can be obtained if the density of the electrode active material layer is a value equal to or more than the lower limit value. On the other hand, if the density of the electrode active material layer is equal to or less than the upper limit value, it is possible to prevent a decrease in the porosity of the negative electrode active material layer. If the decrease in the porosity is suppressed, the electrolyte solution filling the gap is sufficiently secured, and thus, an increase in the ion transfer resistance in the negative electrode active material layer can be prevented. As a result, deterioration of output characteristics (in particular, output characteristics at a high rate) of a battery can be suppressed. The density of the negative electrode active material layer can be measured by the following method. If the same value can be obtained, a value measured by another method may be used.

Method for Measuring Density of Active Material Layer

The density of the active material layer is calculated according to the following Equation (3).

Electrode density(g/$cm^3$)=Weight (g) of solid material÷Volume($cm^3$) of electrode.  Equation (3):

In addition, the weight of the solid materials is calculated by adding up only the weight of the solid material among the weights of the respective materials in the electrode after pressing, obtained in the above (e). The volume of the electrode is calculated from the thickness of the electrode and the coating area.

<Method for Producing Electrode>

The method for producing an electrode for a non-aqueous electrolyte secondary battery according to the present aspect is not particularly limited, but the method preferably includes preparing an electrode active material slurry and forming a coating film by coating the surface of the current collector with the electrode active material slurry.

Hereinafter, an example of the preferred method for producing an electrode for a non-aqueous electrolyte secondary battery according to the present aspect will be described.

[Preparation of Dispersion]

First, an electrode active material, a binder formed of polyvinylidene fluoride (PVdF), a first solvent in which the polyvinylidene fluoride (PVdF) is not dissolved, and a second solvent in which the polyvinylidene fluoride (PVdF) can be dissolved are mixed in the preparation of an electrode active material slurry. Thus, a dispersion is prepared.

Here, specific configurations of the electrode active material and the binder formed of polyvinylidene fluoride (PVdF) are as described above, and thus, detailed description thereof will be omitted here.

(First Solvent)

The first solvent is a solvent in which polyvinylidene fluoride (PVdF) is not dissolved. In the present specification, an expression that a certain solid content is "not dissolved" in a solvent means that the solubility (25° C.) of the solid content in the solvent is less than 0.1 g/100 g solvent.

Specific kinds of the first solvent are not unambiguously determined. Examples of the first solvent include ethylene carbonate (EC), propylene carbonate (PC), diethyl carbonate (DEC), and the like.

In a preferred embodiment, the first solvent is a solvent having low volatility (that is, a low vapor pressure). Specifically, the vapor pressure of the first solvent at 25° C. is preferably less than 3,200 Pa, and more preferably less than 1,000 Pa.

Moreover, in another preferred embodiment, it is preferable that the first solvent includes a solvent constituting an electrolyte solution (liquid electrolyte) for use in a non-aqueous electrolyte secondary battery to which an electrode produced by the production method according to the present aspect is applied, and it is more preferable that the first solvent is the same as such the solvent. From this viewpoint, in a preferred embodiment, the first solvent is a mixed solvent of EC and PC or a mixed solvent of EC and DEC. In this case, the mixing ratio (volume ratio) of EC and PC or DEC is preferably 3:7 to 7:3, more preferably 2:3 to 3:2, and still more preferably about 1:1.

The amount of the first solvent to be used is not particularly limited, but it is preferable to use the first solvent in an amount enough to exactly maintain the solid content constituting the electrode active material layer. With this configuration, it is possible to enhance the production efficiency, in particular, in a case where a solvent included in the electrolyte solution of a battery is used as it is as the first solvent.

Second Solvent

The second solvent is a solvent in which polyvinylidene fluoride (PVdF) can be dissolved. In the present specification, an expression that a certain solid content is "soluble" in a solvent means that the solubility (25° C.) of the solid content in the solvent is 0.1 g/100 g or more.

The second solvent is preferably a solvent having high volatility from the viewpoint of easiness of removal, and examples thereof include dimethyl carbonate (dimethyl carbonate, DMC), acetone, ethanol, and the like. Among those, dimethyl carbonate is particularly preferable from the viewpoint of a low water content in the solvent.

In a preferred embodiment, the second solvent is a solvent having higher volatility than the first solvent. In other words, the second solvent is a solvent whose vapor pressure is higher than that of the first solvent. Specifically, the vapor pressure of the second solvent at 25° C. is more preferably 3,200 Pa or more, and still more preferably 6,000 Pa or more.

The amount of the second solvent to be used is not particularly limited, and may be an amount enough to dissolve polyvinylidene fluoride (PVdF) constituting the binder in the obtained dispersion. Furthermore, since the second solvent is removed as described later, too much energy and time for removing the second solvent are consumed if the amount of the second solvent to be used is too high. For example, the amount of the second solvent to be used is preferably 100 to 20,000% by mass, and more preferably 900 to 9,900% by mass, with respect to 100% by mass of polyvinylidene fluoride (PVdF) included in the dispersion to be prepared.

Other Components

The electrode active material slurry may include other components. For example, in a case where the above-mentioned components (a conductive aid, an electrolyte solution, an ion conductive polymer, and the like) are used as constituents of the electrode active material layer, the dispersion can be included simultaneously in the preparation of the dispersion in the present step. The specific constitutions of these components are as described above, and thus, detailed description thereof will be omitted here.

The composition of the dispersion obtained by mixing the above components is not particularly limited, but the dispersion preferably has such a composition that the composition upon removal of the second solvent is similar to the composition of the electrode active material layer.

In the present step, the mixing order, the mixing method, and the like of the respective components to obtain the dispersion are not particularly limited. However, considering the battery performance, it is preferable to strictly exclude the mixing of moisture in the step of preparing the dispersion (and an electrode active material slurry which will be described later).

The method for preparing the dispersion is not particularly limited, and appropriate reference can be made to findings known in the related art such as the addition order of the members, the mixing method, and the like. However, since the concentration of the solid content of the dispersion in this step may be relatively high, it is preferable to use a mixer capable of imparting high shear as a mixer for mixing the respective materials. Specifically, a planetary mixer, a kneader, a homogenizer, an ultrasonic homogenizer, or a blade-type stirrer such as a disposer and the like is preferable, and in particular, the planetary mixer is particularly preferable from the viewpoint of solid kneading. Further, the specific mixing method is not also particularly limited, but it is preferable to perform solid kneading at a higher concentration of the solid content than the final concentration of the solid content of the obtained dispersion, and then add a solvent component (preferably a first solvent, and more preferably an electrolyte solution further including a lithium salt), followed by further mixing. In addition, the mixing time is not particularly limited and may be a time that enables uniform mixing to be achieved. For example, solid kneading and subsequent mixing may be performed for 10 to 60 minutes, respectively, and each step may be performed at a time or may also be dividedly performed several times.

Here, with regard to preferred embodiments in the preparation of a dispersion, in a case where the first solvent includes a solvent constituting an electrolyte solution (liquid electrolyte) for use in a non-aqueous electrolyte secondary battery to which an electrode produced by the production method according to the present aspect is applied, it is preferable that an electrolyte solution as a mixture of the first solvent and a lithium salt is prepared in advance, and then added in the preparation of an electrode active material slurry and used. Here, the concentration of the lithium salt in the electrolyte solution is preferably 0.5 to 3 mol/L. Further, the lithium salt is preferably the one described in the section (Electrolyte Solution) above, and from the viewpoint of battery output and charge/discharge cycle characteristics, $LiPF_6$ or $Li[(FSO_2)_2N](LiFSI)$ is more preferable, and $LiPF_6$ is particularly preferable. It is possible to prepare such an electrolyte solution with reference to a method known in the related art. Furthermore, in the preparation of the electrolyte solution, as additive, for example, vinylene carbonate, methyl vinylene carbonate, dimethyl vinylene carbonate, phenyl vinylene carbonate, diphenyl vinylene carbonate, ethyl vinylene carbonate, diethyl vinylene carbonate, vinyl ethylene carbonate, 1,2-divinyl ethylene carbonate, 1-methyl-1-vinyl ethylene carbonate, 1-methyl-2-vinyl ethylene carbonate, 1-ethyl-1-vinyl ethylene carbonate, 1-ethyl-2-vinyl ethylene carbonate, vinyl vinylene carbonate, allyl ethylene carbonate, vinyloxymethyl ethylene carbonate, allyloxymethyl ethylene carbonate, acryloxymethyl ethylene carbonate, methacryloxymethyl ethylene carbonate, ethynyl ethylene carbonate, propargyl ethylene carbonate, ethynyloxy methylethylene carbonate, propargyloxy ethylene carbonate, methylene ethylene carbonate, 1,1-dimethyl-2-methylene ethylene carbonate, or the like can further be added. Among those, vinylene carbonate, methyl vinylene carbonate, or vinyl ethylene carbonate is preferable, and vinylene carbonate or vinyl ethylene carbonate is more preferable. Such additives may be used alone or in combination of two or more kinds thereof.

Moreover, in another preferred embodiment, a solution in which polyvinylidene fluoride (PVdF) is dissolved in a second solvent is prepared in advance by mixing a binder formed of polyvinylidene fluoride (PVdF) with the second solvent in which the binder can be dissolved in advance, and the solution may be added and used in the preparation of an electrode active material slurry. By using such a method, it is possible to further improve the dispersion state in the dispersion of polyvinylidene fluoride (PVdF), and thus, it is possible to further enhance the surface smoothness of the obtained electrode active material layer. Incidentally, the concentration of the binder solution is not particularly limited, but from the viewpoint of improving the dispersion state of the binder, the concentration of the binder solution is preferably approximately 0.5 to 10% by mass, and more preferably approximately 2 to 8% by mass. In addition, the polyvinylidene fluoride (PVdF) and the second solvent may be heated to approximately 40 to 80° C. in a mixed state and subjected to a mixing operation for approximately 0.5 to 60 minutes in the preparation of the binder solution.

Removal of Second Solvent and Preparation of Electrode Active Material Slurry

Subsequently, the second solvent is removed from the dispersion obtained in the above step. Thus, an electrode active material slurry is prepared. Furthermore, the step of removing the second solvent may be performed after a certain period of time after the preparation of the dispersion or may be performed continuously during or immediately after the preparation of the dispersion.

A specific method for removing the second solvent is not particularly limited and may be any of methods for substantially removing the second solvent from the dispersion obtained above. For example, by continuously stirring the dispersion obtained above using a known stirring means such as a mixing defoaming machine and the like for a certain period of time, the second solvent can be gradually removed. In this case, the stirring speed is not particularly limited, but is preferably 100 to 5,000 rpm. In addition, the stirring time is not particularly limited and is preferably approximately 10 seconds to 240 minutes. In addition, the second solvent may also be removed by heating the dispersion obtained above at a temperature lower than the crystallization temperature of polyvinylidene fluoride (PVdF).

An electrode active material slurry can be obtained by removing the second solvent as above. The content of the second solvent in the obtained electrode active material slurry is not particularly limited, but is preferably 1 part by mass or less, and more preferably 0.1 part by mass or less (lower limit value: 0 part by mass), with respect to 100 parts by mass of the solid content of the electrode active material slurry. On the other hand, the lower limit value of the content of the second solvent in the electrode active material slurry is not particularly limited, but is preferably 1 part by mass or less, and more preferably 0.1 parts by mass or less, with respect to 100 parts by mass of the solid content of the electrode active material slurry (lower limit value: 0 parts by mass).

Moreover, the electrode active material slurry obtained as above contains a solid content constituting the electrode active material layer and a first solvent, and in some cases, a trace amount of a second solvent. The concentration of the solid content of the electrode active material slurry is preferably 50% by mass or more, more preferably 55% by mass or more, still more preferably 57% by mass or more, particularly preferably 60% by mass or more, and most preferably 62% by mass or more in a case where the electrode active material slurry is used to form a positive electrode active material layer (that is, in a case of the positive electrode active material layer). Furthermore, the concentration of the solid content of the electrode active material slurry is preferably 35% by mass or more, more preferably 37% by mass or more, still more preferably 39% by mass or more, particularly preferably 40% by mass, and most preferably 42% by mass or more in a case where the electrode active material slurry is used to form a negative electrode active material layer (that is, in a case of the negative electrode active material slurry). On the other hand, the upper limit value of the concentration of the solid content of the coating liquid according to the present aspect is not particularly limited, but the concentration of the solid content of the coating liquid according to the present aspect is preferably 80% by mass or less in a case where the coating liquid is used to form a positive electrode active material layer. The concentration of the solid content of the electrode active material slurry is preferably 55% by mass or less in a case where the coating liquid is used to form the negative electrode active material layer (that is, in a case of the slurry for a negative electrode active material layer). If the concentration is within the range, an electrode active material layer having a sufficient thickness in the coating step which will be described later can be easily formed. In addition, adjustment of the porosity or the density is facilitated with a pressing treatment to be carried out as necessary.

Coating Step

In the coating step, the surface of the current collector is coated with the electrode active material slurry obtained above to form a coating film. The coating film finally constitutes the electrode active material layer.

A coating means for carrying out the coating in a coating step is not particularly limited and a coating means known in the related art can appropriately be used. In particular, from the viewpoint that a coating film (electrode active material layer) having a surface with high smoothness is obtained by coating the electrode active material slurry having a high concentration of the solid content, it is preferable to use a coating means capable of coating the electrode active material slurry at such a coating rate that a relatively high shear stress is applied at the time of coating. Among those, a coating method using a slit die coater for performing coating by applying an electrode active material slurry from a slit is an example of highly suitable coating means due to thin-film coating and excellent uniformity in the coating thickness.

The thickness of the coating film obtained by coating in the coating step is not particularly limited, and may appropriately be set so as to finally achieve the thickness of the electrode active material layer.

It is preferable that the method does not include a step of crystallizing the polyvinylidene fluoride (PVdF) included in the obtained coating film after obtaining the coating film by coating the electrode active material slurry. In other words, it is preferable that a step of subjecting the obtained coating film to a heating treatment to an extent that the polyvinylidene fluoride (PVdF) included in the coating film is crystallized is not included. In addition, it is more preferable that a step of subjecting the obtained coating film to a heating treatment is not included. In a case where such the heating treatment is not performed, the polyvinylidene fluoride (PVdF) in a non-crystallized state is included in the electrode active material layer. Here, since the polyvinylidene fluoride (PVdF) in the non-crystallized state has a fibrous shape, the PVdF in the non-crystallized state binds the constituents of the active material layer, such as the positive electrode active material and the like, in the fibrous form, as shown in FIG. 2A, in a case where the coating film is not subjected to a heating treatment in the preparation of an electrode. Furthermore, in a case where the heating treatment is not performed after the electrode active material slurry is coated, it is difficult to cut out the electrode in a desired area after applying the electrode active material slurry. Accordingly, in the method, it is necessary to apply the electrode active material slurry onto the surface of the current collector so as to reach a desired area. For this purpose, the surface of the current collector other than the applied part may be subjected to a masking treatment or the like in advance.

In the method, the coating film obtained by coating with the electrode active material slurry may be subjected to a pressing treatment. If the pressing treatment is performed, it is preferable that the press is performed in a state where a porous sheet is arranged on the surface of the coating film. Furthermore, an active material layer having higher surface uniformity can be obtained by performing such the pressing treatment. Furthermore, a porous sheet is used for the purposes of preventing the slurry from being adhered to a pressing apparatus when the coating film is pressed; absorbing the excess electrolyte solution exuded during the pressing; and the like. Therefore, the material and the form of the porous sheet are not particularly limited as long as they can achieve the purposes.

For example, the same ones as a microporous film, a nonwoven fabric, and the like which are used as a separator in the present technical field can be used as the porous sheet. Specific examples of the microporous film include a microporous film formed of a hydrocarbon-based resin such as polyimide, aramid, polyvinylidene fluoride-hexafluoropropylene (PVdF-HFP), and the like; a glass fiber; or the like. In addition, examples of the nonwoven fabric include a nonwoven fabric in which cotton, rayon, acetate, nylon, and polyester, a polyolefin such as PP, PE, and the like; and polyimide, aramid, or the like are used alone or in mixture thereof.

Furthermore, the porous sheet may be removed after pressing or may also be used as it is as a separator of a battery. In a case where the porous sheet is used as it is as the separator after pressing, an electrolyte Layer may be formed using the porous sheet alone as the separator, or an electrolyte Layer may also be formed by combining the porous sheet with another separator (that is, using two or more separators).

The pressing apparatus for performing the pressing treatment is preferably an apparatus with which a pressure is uniformly applied to the entire surface of the coating film, and specifically, HIGH PRESSURE JACK J-1 (manufactured by AS ONE Corporation) can be used. The pressure at the time of pressing is not particularly limited, but is preferably 5 to 40 MPa, more preferably 10 to 35 MPa, and still more preferably 12 to 35 MPa. With the pressure within the above range, the porosity or the density of the electrode active material layer according to the above-mentioned preferable embodiments can be easily achieved.

<Constituents Other than Electrode>

Hereinabove, the electrode among the constituents of the bipolar secondary battery according to the present embodiment of the present invention, and the method for producing the same are described in detail, but appropriate reference can be made to findings known in the related art.

Electrolyte Layer

An electrolyte for use in the electrolyte layer of the present aspect is not particularly limited, and a liquid electrolyte, a gel polymer electrolyte, or an ionic liquid electrolyte is used without limitation. By using such the electrolyte, high lithium ion conductivity can be secured.

The liquid electrolyte has a function as a carrier of a lithium ion. The liquid electrolyte constituting an electrolyte solution layer has a form in which a lithium salt is dissolved in an organic solvent. As the organic solvent and the lithium salt to be used, for example, the same ones as those exemplified as the solvents and the lithium salt to be used for constitution of the electrode active material slurry in the method for producing an electrode for a non-aqueous electrolyte secondary battery can be used. The above-mentioned additive may further be included in the liquid electrolyte. In addition, the concentration of the lithium salt in the liquid electrolyte is preferably 0.1 to 3.0M, and more preferably 0.8 to 2.2 M. Incidentally, in a case where the additive is used, the amount of the additive to be used is preferably 0.5 to 10% by mass, and more preferably 0.5 to 5% by mass, with respect to 100% by mass of the liquid electrolyte before adding the additive.

As the organic solvent, the organic solvent described in the section above (First Solvent) can be preferably used. Furthermore, as the lithium salt, the lithium salt described in the section above (electrolyte solution) can be preferably used. Among those, from the viewpoints of a battery output and charge/discharge cycle characteristics, $LiPF_6$ or $Li[(FSO_2)_2N](LiFSI)$ is more preferable, and $LiPF_6$ is particularly preferable.

The gel polymer electrolyte has a configuration in which the liquid electrolyte is injected into a matrix polymer (host polymer) formed of an ion conductive polymer. By using the gel polymer electrolyte as an electrolyte, the fluidity of the electrolyte is lost and the ion conductivity between the layers is easily blocked, and therefore, the use of the gel polymer electrolyte is excellent. Examples of the ion conductive polymer used as a matrix polymer (host polymer) include polyethylene oxide (PEO), polypropylene oxide (PPO), polyethylene glycol (PEG), polyacrylonitrile (PAN), polyvinylidene fluoride-hexafluoropropylene (PVdF-HEP), polymethyl methacrylate (PMMA), copolymers thereof, and the like.

The matrix polymer of the gel polymer electrolyte can exhibit an excellent mechanical strength by forming a crosslinked structure. In order to form the crosslinked structure, a polymerizable polymer for forming a polymer electrolyte (for example, PEO or PPO) may be subjected to a polymerization treatment such as thermal polymerization, ultraviolet polymerization, radiation polymerization, electron beam polymerization, and the like, using an appropriate polymerization initiator.

The ionic liquid electrolyte is in the form in which a lithium salt is dissolved in an ionic liquid. In addition, the ionic liquid refers to a series of compounds that are salts formed of only a cation and an anion and are liquid at normal temperature.

The cation component constituting the ionic liquid is preferably at least one selected from the group consisting of a substituted or unsubstituted imidazolium ion, a substituted or unsubstituted pyridinium ion, a substituted or unsubstituted pyrrolium ion, a substituted or unsubstituted pyrazolium ion, a substituted or unsubstituted pyrrolinium ion, a substituted or unsubstituted pyrrolidinium ion, a substituted or unsubstituted piperidinium ion, a substituted or unsubstituted triadinium ion, and a substituted or unsubstituted ammonium ion.

Specific examples of the anion component constituting the ionic liquid include a halide ion such as a fluoride ion, a chloride ion, a bromide ion, an iodide ion, and the like, a nitrate ion ($NO_3^-$), a tetrafluoroborate ion ($BF_4^-$), a hexafluorophosphate ion ($PF_6^-$), $(FSO_2)_2N^-$, $AlCl_3^-$, a lactate ion, an acetate ion ($CH_3COO^-$), a trifluoroacetate ion ($CF_3COO^-$), a methanesulfonate ion ($CH_3SO_3^-$), a trifluoromethane sulfonate ion ($CF_3SO_3^-$), a bis(trifluoromethanesulfonyl)imide ion (($CF_3SO_2)_2N^-$), a bis(pentafluoroethylsulfonyl)imide ion (($C_2F_5SO_2)_2N^-$), $BF_3C_2F_5^-$, a tris(trifluoromethanesulfonyl) carbonate ion (($CF_3SO_2)_3C^-$), a perchlorate ion ($ClO_4^-$), a dicyanamide ion (($CN)_2N^-$), an organic sulfate ion, an organic sulfonate ion, $R^1COO^-$, $HOOCR^1COO^-$, $-OOCR^1COO^-$, $NH_2CHR^1COO^-$ (in which $R^1$ is a substituent, which is an aliphatic hydrocarbon group, an alicyclic hydrocarbon group, an aromatic hydrocarbon group, an ether group, an ester group, or an acyl group, and the substituent may include a fluorine atom), and the like.

Preferable examples of the ionic liquid include 1-methyl-3-methylimidazolium bis(trifluoromethanesulfonyl)imide and N-methyl-N-propylpyrrolidium bis(trifluoromethanesulfonyl)imide. These ionic liquids may be used alone or in combination of two or more kinds thereof.

The lithium salt and the additives used in the ionic liquid electrolyte are the same as those used in the liquid electrolyte as described above.

In the bipolar secondary battery in the present aspect, a separator may be employed for the electrolyte layer. The separator has a function of holding an electrolyte to secure lithium ion conductivity between a positive electrode and a negative electrode and a function as a partition wall between the positive electrode and the negative electrode. In particular, in a case where a liquid electrolyte or an ionic liquid electrolyte is used as the electrolyte, it is preferable that the separator is employed.

Examples of a form of the separator include a porous sheet separator, a nonwoven fabric separator, and the like, each of which is formed of a polymer or fiber that absorbs and holds the electrolyte.

As the porous sheet separator formed of the polymer or the fiber, for example, a microporous (microporous film) separator can be used. Specific examples of the form of the porous sheet formed of the polymer or the fiber include a microporous (microporous film) separator formed of a hydrocarbon-based resin such as a polyolefin including polyethylene (PE), polypropylene (PP), and the like; a laminate obtained by laminating a plurality of these polyolefins (for example, a laminate having a three-layer structure of PP/PE/PP, and the like), polyimide, aramid, or polyvinylidene fluoride-hexafluoropropylene (PVdF-HFP), and the like; a glass fiber; etc.

The thickness of the microporous (microporous film) separator cannot be unequivocally defined since the thickness varies depending on an intended use. For example, the thickness of a separator used in the applications of a motor-driving secondary battery such as an electric vehicle (EV), a hybrid electric vehicle (HEV), a fuel cell vehicle (FCV), and the like; etc. is desirably 4 to 60 µm in a single layer or multiple layers. The microporous (microporous film) separator desirably has a fine pore diameter of 1 µm at maximum (usually a pore diameter of approximately several tens nm).

Examples of the nonwoven fabric separator include a nonwoven fabric using a conventionally known material such as cotton, rayon, acetate, nylon, polyester; a polyolefin such as PP, PE, and the like; polyimide, aramid, and the like alone or in combination thereof. The bulk density of the nonwoven fabric should not be particularly limited as long as sufficient battery characteristics can be obtained by a polymer gel electrolyte with which the nonwoven fabric is impregnated. In addition, the thickness of the nonwoven fabric separator only needs to be the same as that of the electrolyte layer, and is preferably 5 to 200 µm, and particularly preferably 10 to 100 µm.

Moreover, it is also preferable to use a laminate obtained by laminating a heat resistant insulating layer on the above-described microporous (microporous film) separator or nonwoven fabric separator as a resin porous substrate layer (separator with a heat resistant insulating layer). The heat resistant insulating layer is a ceramic layer including inorganic particles and a binder. As the separator with a heat resistant insulating layer, a separator having high heat resistance, which has a melting point or thermal softening point of 150° C. or higher, and preferably 200° C. or higher, is used. The presence of the heat resistant insulating layer relaxes an internal stress of the separator which increases as the temperature rise, and therefore, an effect of suppressing thermal shrinkage can be obtained. As a result, induction of a short-circuit between electrodes of a battery can be prevented, leading to a battery configuration in which the performance is hardly lowered as the temperature rises. In addition, the presence of the heat resistant insulating layer improves a mechanical strength of the separator with the heat resistant insulating layer, and hardly breaks a film of the separator. Furthermore, the separator is hardly curled in a step of producing a battery due to the effect of suppressing thermal shrinkage and the high mechanical strength.

The inorganic particles in the heat resistant insulating layer contribute to the mechanical strength of the heat resistant insulating layer and the effect of suppressing thermal shrinkage. A material used as the inorganic particles is not particularly limited. Examples thereof include oxides ($SiO_2$, $Al_2O_3$, $ZrO_2$, and $TiO_2$), hydroxides, and nitrides of silicon, aluminum, zirconium, and titanium, and composites thereof. These inorganic particles may be derived from mineral resources such as boehmite, zeolite, apatite, kaolin, mullite, spinel, olivine, mica, or the like or may be artificially produced. Further, these inorganic particles may be used alone or in combination of two or more kinds thereof. Among those, from the viewpoint of cost, the inorganic particles, silica ($SiO_2$), or alumina ($Al_2O_3$) is preferably used, and alumina ($Al_2O_3$) is more preferably used.

The weight per unit area of the inorganic particles is not particularly limited, but is preferably 5 to 15 $g/m^2$. The weight per unit area within this range is preferable in terms of obtaining sufficient ion conductivity and maintaining heat resistant strength.

The binder in the heat resistant insulating layer has a function of binding inorganic particles to each other or binding the inorganic particles to a resin porous substrate layer. With the binder, the heat resistant insulating layer is stably formed, and thus, peeling between the resin porous substrate layer and the heat resistant insulating layer is prevented.

The binder used in the heat resistant insulating layer is not particularly limited, and for example, a compound such as carboxymethyl cellulose (CMC), polyacrylonitrile, cellulose, an ethylene-vinyl acetate copolymer, polyvinyl chloride, styrene-butadiene rubber (SBR), isoprene rubber, butadiene rubber, polyvinylidene fluoride (PVDF), polytetrafluoroethylene (PTFE), polyvinyl fluoride (PVF), methyl acrylate, and the like can be used as the binder. Among those, carboxymethyl cellulose (CMC), methyl acrylate, or polyvinylidene fluoride (PVDF) is preferably used. These compounds may be used alone or in combination of two or more kinds thereof.

The content of the binder in the heat resistant insulating layer is preferably 2 to 20% by mass with respect to 100% by mass of the heat resistant insulating layer. If the content of the binder is 2% by mass or more, the peeling strength between the heat resistant insulating layer and the resin porous substrate layer can be enhanced, and vibration resistance of the separator can be improved. On the other hand, if the content of the binder is 20% by mass or less, a gap between the inorganic particles can be maintained properly, and therefore, sufficient lithium ion conductivity can be secured.

The thermal shrinkage of the separator with a heat resistant insulating layer is preferably 10% or less in both MD and TD after the separator is held under conditions of 150°

C. and 2 gf/cm$^2$ for one hour. By using such a highly heat resistant material, the heat generation amount is increased, and shrinkage of the separator can be prevented effectively even when the temperature in a battery reaches 150° C. As a result, induction of a short-circuit between electrodes of a battery can be prevented, leading to a battery configuration in which the performance is hardly lowered as the temperature rises.

[Positive Electrode Current Collecting Plate and Negative Electrode Current Collecting Plate]

A material constituting current collecting plates (25 and 27) is not particularly limited and a known highly conductive material used in the related art as a current collecting plate for use in a lithium ion secondary battery can be used. Preferable examples of the material constituting the current collecting plate include a metal material such as aluminum, copper, titanium, nickel, stainless steel (SUS), an alloy thereof, and the like. From the viewpoints of light weight, corrosion resistance, and high conductivity, aluminum and copper are more preferable, and aluminum is particularly preferable. In addition, the same material or different materials may be used for the positive electrode current collecting plate 25 and the negative electrode current collecting plate 27.

[Positive Electrode Lead and Negative Electrode Lead]

Moreover, although not illustrated, a current collector 11 may be electrically connected to the current collecting plates (25 and 27) via a positive electrode lead or a negative electrode lead. As a material constituting the positive electrode and the negative electrode leads, a material for use in a known lithium ion secondary battery can be similarly adopted. Further, a portion taken out of an exterior material is preferably coated with a heat resistant and insulating thermal shrinkable tube or the like such that the portion has no influence on a product (for example, vehicle parts, in particular, an electronic device or the like) by electric leak due to contact with neighboring devices, wiring, or the like.

[Seal Part]

The seal part (insulating layer) has a function of preventing a contact between current collectors and a short-circuit at an end of a single battery layer. A material constituting the seal part may be any material as long as having an insulating property, a sealing property against falling off of a solid electrolyte, a sealing property against moisture permeation from the outside, heat resistance under a battery operating temperature, and the like. Examples of the material include an acrylic resin, a urethane resin, an epoxy resin, a polyethylene resin, a polypropylene resin, a polyimide resin, a rubber (ethylene-propylene-diene rubber: EPDM), and the like. An isocyanate-based adhesive, an acrylic resin-based adhesive, a cyanoacrylate-based adhesive, or the like may be used, and a hot melt adhesive (a urethane resin, a polyamide resin, or a polyolefin resin) or the like may be used. Among those, a polyethylene resin and a polypropylene resin are preferably used as a material constituting an insulating layer from the viewpoints of corrosion resistance, chemical resistance, manufacturing easiness (film-forming property), economic efficiency, and the like, and a resin mainly containing an amorphous polypropylene resin and obtained by copolymerizing ethylene, propylene, and butene is preferably used.

[Battery Outer Casing Body]

As the battery outer casing body, a known metal can case can be used, and in addition, a bag-like case using the laminate film 29 including aluminum, which is capable of coating a power generating element as shown in FIG. 1, can be used. For the laminate film, for example, a laminate film having a three-layer structure obtained by laminating PP, aluminum, and nylon in this order, or the like can be used, but the laminate film is not limited thereto at all. A laminate film is desirable from the viewpoint of being able to be suitably used for a large device battery for EV or HEV due to a high output and excellent cooling performance. In addition, the outer casing body is more preferably an aluminum laminate since a group pressure to a power generating element applied from the outside can be easily adjusted, and the thickness of an electrolyte solution layer can be easily adjusted to a desired thickness.

It is possible to improve output characteristics at a high rate by incorporating the above-mentioned negative electrode for a non-aqueous electrolyte secondary battery into the bipolar secondary battery of the present aspect. Therefore, the bipolar secondary battery of the present aspect is suitably used as a power source for driving EV or HEV.

[Cell Size]

Figure 3:
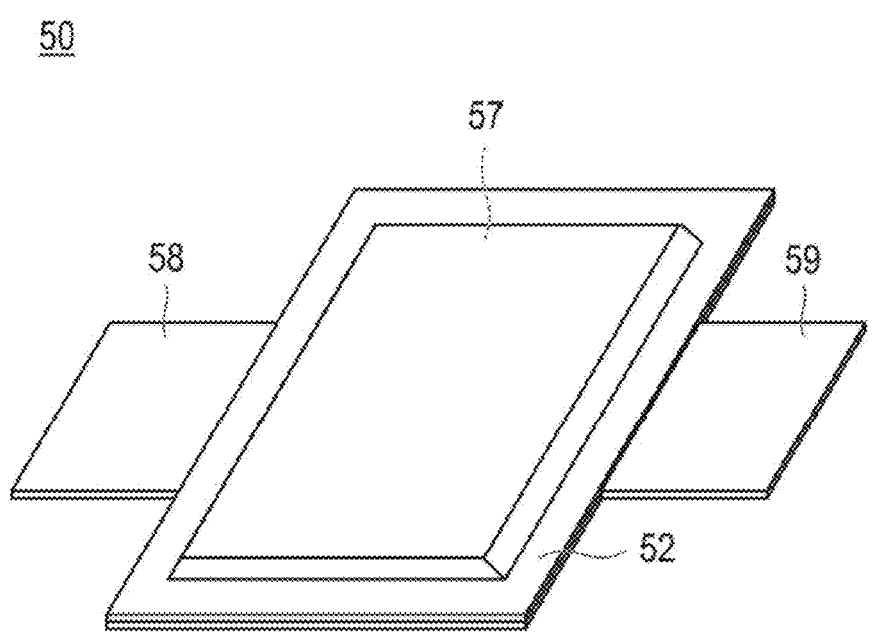
FIG. 3 is a perspective view illustrating an appearance of a flat lithium ion secondary battery which is a typical embodiment of a secondary battery.

FIG. 3 is a perspective view illustrating an appearance of a flat bipolar lithium ion secondary battery which is a typical embodiment of a secondary battery.

As illustrated in FIG. 3, a flat bipolar secondary battery 50 has a rectangular flat shape, and a positive electrode tab 58 and a negative electrode tab 59 are illustrated from both sides thereof to draw electric power. A power generating element 57 is surrounded by a battery outer casing body (laminate film 52) of the bipolar secondary battery 50, a periphery thereof is thermally fused, and the power generating element 57 is sealed while the positive electrode tab 58 and the negative electrode tab 59 are drawn to the outside. Here, the power generating element 57 corresponds to the power generating element 21 of the bipolar secondary battery 10 illustrated in FIG. 1 described above. In the power generating element 57, a plurality of bipolar electrodes 23 are laminated through the electrolyte layers 17.

Moreover, the lithium ion secondary battery is not limited to a laminate type battery having a flat shape. For example, a wound-type lithium ion secondary battery may, for example, have a cylindrical shape or a rectangular flat shape obtained by deforming such a cylindrical shape, but is not particularly limited thereto. In the battery having a cylindrical shape, a laminate film, a conventional cylindrical can (metal can), or the like may be used for an outer casing body thereof, but is not particularly limited thereto. A power generating element is preferably packaged with an aluminum laminate film. This form can achieve a reduction in weight.

Furthermore, drawing of the tabs (58 and 59) illustrated in FIG. 3 is not also particularly limited. For example, the positive electrode tab 58 and the negative electrode tab 59 may be drawn from the same side, or each of the positive electrode tab 58 and the negative electrode tab 59 may be divided into a plurality of parts to be drawn from the sides, without being limited to that illustrated in FIG. 3. In addition, in the wound-type lithium ion secondary battery, a terminal may be formed using, for example, a cylindrical can (metal can) in place of the tab.

In a typical electric vehicle, the storage space of a battery is approximately 170 L. Since a cell and an auxiliary machine such as a charge/discharge control device and the like are stored in this space, the storage space efficiency of the cell is usually approximately 50%. The loading efficiency of the cell in this space is a factor that dominates a cruising distance of an electric car. When the size of a unit cell is small, the loading efficiency is impaired, and thus, the cruising distance cannot be secured.

Therefore, in the present invention, the battery structure in which the power generating element is covered with the outer casing body is preferably large. Specifically, the length of a short side of a laminate cell battery is preferably 100 mm or more. Such a large battery can be used in vehicle applications. Here, the length of the short side of the laminate cell battery refers to a side having the shortest length. An upper limit of the length of the short side is not particularly limited, but is usually 400 mm or less.

[Volume Energy Density and Rated Discharge Capacity]

In a general electric vehicle, a market request is that a traveling distance (cruising distance) per one charge is 100 km. Considering such a cruising distance, the volume energy density of a battery is preferably 157 Wh/L or more, and a rated capacity thereof is preferably 20 Wh or more.

In addition, an increase in the size of a battery can be defined from a relationship to battery area and battery capacity from the viewpoint of a large battery different from the viewpoint of the physical size of an electrode. For example, in a case of a laminate battery which is of a flat laminate type, a battery in which a value of the ratio of a battery area (a projected area of the battery including a battery outer casing body) to the rated capacity is 5 cm$^2$/Ah or more and the rated capacity is 3 Ah or more has a large battery area per unit capacity, and therefore, more easily makes the problem of the present invention revealed. That is, due to ion transfer resistance and electron transfer resistance accompanying thickening of a negative electrode active material layer, a charging and discharging reaction is less likely to progress uniformly not only in a thickness direction of the negative electrode active material layer but also in a planar direction, and output characteristics (particularly, output characteristics at a high rate) of the battery tend to be further lowered. Therefore, the non-aqueous electrolyte secondary battery according to the present aspect is preferable since such a large battery as described above has a more advantage due to exhibition of the effect of the invention of the present application.

[Battery Pack]

A battery pack is constituted by connecting a plurality of batteries to each other. Specifically, the battery pack is formed by serialization of at least two batteries, parallelization thereof, or serialization and parallelization thereof. By serialization and parallelization, it is possible to freely adjust a capacity and a voltage.

By connecting a plurality of batteries to each other in series or in parallel, it is also possible to form a small attachable or detachable battery pack. In addition, by further connecting a plurality of the small attachable or detachable battery packs to each other in series or in parallel, it is also possible to form a large-capacity and large-output battery pack suitable for a vehicle driving power source or auxiliary power source required to have a high volume energy density and a high volume output density, and it may be decided how many batteries are connected to each other to manufacture a battery pack and how many stages of small assembled batteries are laminated to manufacture a large-capacity battery pack, depending on the battery capacity or output of a vehicle (electric vehicle) on which the batteries are mounted.

[Vehicle]

In the non-aqueous electrolyte secondary battery of the present aspect, a discharge capacity is maintained even after a long-term use, and cycle characteristics are favorable. Furthermore, a volume energy density is high. In a case of use for a vehicle such as an electric vehicle, a hybrid electric vehicle, a fuel cell vehicle, or a hybrid fuel cell vehicle, higher capacity, a larger size, and a longer life are required than in a case of applications of electric/portable electronic devices. Therefore, the non-aqueous electrolyte secondary battery can be suitably used as a vehicle power source, for example, for a vehicle driving power source or an auxiliary power source.

Specifically, a battery or a battery pack formed by combining a plurality of the batteries can be mounted on the vehicle. In the present invention, a long-life battery excellent in long-term reliability and output characteristics can be constituted, and thus, by mounting the battery, a plug-in hybrid electric vehicle having a long EV travel distance and an electric vehicle having a long one-charge travel distance can be constituted. A reason therefor is that an automobile having a long service life and high reliability can be provided by using a battery or a battery pack formed by combining a plurality of the batteries in, for example, an automobile such as a hybrid car, a fuel cell electric car, and an electric vehicle (including a two-wheel vehicle (motor bike) or a three-wheel vehicle in addition to all four-wheel vehicles (an automobile, a truck, a commercial vehicle such as a bus and the like, a compact car, etc.)). However, the applications are not limited to the automobiles, and the battery can also be applied to, for example, various power sources of other vehicles, for example, a moving object such as an electric train and the like, or can also be used as a power source for loading such as an UPS device and the like.

EXAMPLES

Hereinafter, the present invention will be described in more detail with reference to Examples. However, the technical scope of the present invention is not limited only to the following Examples. Furthermore, "parts" mean "parts by mass" unless otherwise specified. In addition, steps from preparation of a positive electrode active material slurry and a negative electrode active material slurry to manufacture of a non-aqueous electrolyte secondary battery were performed in a glove box.

Example 1

<Preparation of PVdF Solution>

5 g of polyvinylidene fluoride (PVdF, weight average molecular weight of 380,000) and 95 g of dimethyl carbonate (DMC) were put into a closed bottle such that the outside air and moisture were not incorporated, and stirred at 60° C. for 30 minutes to prepare a 5%-by-mass polyvinylidene fluoride (PVdF) solution.

<Preparation of Electrolyte Solution>

LiPF$_6$ was dissolved at a ratio of 2 mol/L in a mixed solvent of ethylene carbonate (EC) and propylene carbonate (PC) (volume ratio: 1:1) to obtain an electrolyte solution. Incidentally, EC and PC correspond to a first solvent.

<Preparation of Positive Electrode Active Material Slurry>

A material 1 formed of 93.9 parts of LiNi$_{0.8}$Co$_{0.15}$Al$_{0.05}$O$_2$ powder as a positive electrode active material, 5.8 parts of acetylene black [Denka Black (registered trademark) manufactured by Denka Co., Ltd.] (average particle diameter (primary particle diameter): 0.036 μm) as a conductive aid, and 2.9 parts of a carbon fiber (DONACARBO Milled S-243 manufactured by Osaka Gas Chemicals Co., Ltd.: average fiber length of 500 μm, average fiber diameter of 13 μm: electric conductivity of 200 mS/cm)) as a conductive aid was dried for 16 hours at 120° C. under reduced pressure of 100 mmHg to carry out removal of moisture contained.

Subsequently, in a glove box, 31 parts of the electrolyte solution prepared above and 6 parts of the PVdF solution prepared above were added to 63 parts of the material 1 dried above such that the PVdF was included at 1.7% by volume with respect to the total volume of the finally obtained positive electrode. The obtained mixture was mixed at 2,000 rpm for 60 seconds using a mixing defoaming machine (ARE-310, manufactured by Thinky Corporation) to remove a substantially total amount of DMC which is a solvent (second solvent) for dissolving polyvinylidene fluoride (PVdF), thereby obtaining a positive electrode active material slurry. In addition, the concentration of the solid content of the obtained positive electrode active material slurry 1 was 63% by mass.

<Preparation of Negative Electrode Active Material Slurry>

A material 2 formed of 94 parts of hard carbon (hardly graphitized carbon) powder (Carbotron (registered trademark) PS (F) manufactured by Kureha Battery Materials Japan Co., Ltd.) as a negative electrode active material, 4 parts of acetylene black [Denka Black (registered trademark) manufactured by Denka Co., Ltd.] (average particle diameter (primary particle diameter):0.036 μm) as a conductive aid, and 2 parts of a carbon fiber (DONACARBO Milled S-243 manufactured by Osaka Gas Chemical Co., Ltd.: average fiber length of 500 μm, average fiber diameter of 13 μm: electric conductivity of 200 mS/cm) as a conductive aid was dried for 16 hours at 120° C. under reduced pressure of 100 mmHg to carry out removal of moisture contained.

Subsequently, in a glove box, 40 parts of the electrolyte solution prepared above and 14 parts of the PVdF solution prepared above were added to 46 parts of the material 2 dried above such that the PVdF was included at 1.7% by volume with respect to the total volume of the finally obtained negative electrode. The obtained mixture was mixed at 2,000 rpm for 60 seconds using a mixing defoaming machine (ARE-250, manufactured by Thinky Corporation) to obtain a negative electrode active material slurry. In addition, the concentration of the solid content of the obtained negative electrode active material slurry 1 was 46% by mass. <Manufacture of Positive Electrode>

A carbon-coated aluminum foil (manufactured by Showa Denko K. K., a thickness of a carbon layer of 1 μm, a thickness of an aluminum layer of 20 μm, and a size of 61×72 mm) as a positive electrode current collector was prepared and masked using a PET sheet such that the size of a slurry-applied portion was 29×40 mm. The positive electrode active material slurry 1 prepared above was applied onto the positive electrode current collector using an applicator such that a gap of the applicator was 270 μm (coating step). An aramid sheet (a thickness of 45 μm, manufactured by Japan Vilene Co., Ltd.) was arranged on the surface of the slurry after application and pressed at a pressing pressure of 35 MPa using HIGH PRESSURE JACK J-1 (manufactured by AS ONE Corporation) (pressing step) to obtain a positive electrode active material layer. Furthermore, the positive electrode active material layer had a thickness of 280 μm, a porosity of 45%, and a density of 2.35 g/cm³. In addition, a cross-section of the obtained positive electrode active material layer was observed with a scanning electron microscope (SEM), and thus, at least a part of a conductive aid (carbon fiber) formed a conductive path for electrically connecting a first principal surface in contact with an electrolyte layer side of the positive electrode active material layer to a second principal surface in contact with a current collector side.

<Manufacture of Negative Electrode>

A copper foil (manufactured by Thank Metal Co., Ltd., a thickness of 10 μm, a size of 61×72 mm) as a negative electrode current collector was prepared and masked using a PET sheet such that the size of a slurry-applied portion was 33×44 mm. The negative electrode active material slurry 1 was applied onto the negative electrode current collector using an applicator such that a gap of the applicator was 320 μm. An aramid sheet (a thickness of 45 μm, manufactured by Japan Vilene Company, Ltd.) was placed on a surface of the slurry after application and pressed at a pressing pressure of 20 MPa using HIGH PRESSURE JACK J-1 (manufactured by AS ONE Corporation) to obtain a negative electrode active material layer. The negative electrode active material layer had a thickness of 350 μm, a porosity of 40%, and a density of 0.89 g/cm³. As a cross-section of the obtained negative electrode active material layer was observed with a scanning electron microscope (SEM), at least a part of a conductive aid (carbon fiber) formed a conductive path for electrically connecting a first principal surface in contact with an electrolyte layer side of the negative electrode active material layer to a second principal surface in contact with a current collector side.

<Evaluation of Properties and States of Electrode Active Material Layer>

The properties and the states of the electrode active material layer were visually evaluated with respect to the positive electrode and the negative electrode, each manufactured above. As a result, cracks of the electrode active material layer were not observed in both the positive electrode and the negative electrode.

<Manufacture of Non-Aqueous Electrolyte Secondary Battery>

The positive electrode active material layer of the positive electrode and the negative electrode active material layer of the negative electrode, each obtained above, were arranged to face each other, and a separator (manufactured by Celgard, #3501, thickness of 25 μm, size of 96×107 mm) was arranged therebetween to form a power generating element. Further, tabs were respectively connected to the positive electrode current collector and the negative electrode current collector, and a power generating element was sandwiched by an aluminum laminate film-made outer casing body. Further, three sides of the outer casing body were thermally pressure-bonded and sealed to house the power generating element. The electrolyte solution was injected into the power generating element and the outer casing body was sealed in vacuo such that the tabs were led out, thereby obtaining a non-aqueous electrolyte secondary battery. In addition, the amount of the electrolyte solution to be injected was regulated such that the liquid volume coefficient reached 1.5. Further, the electrolyte solution injected here was obtained by dissolving $LiPF_6$ at a ratio of 1 mol/L in a mixed solvent (volume ratio of 1:1) of ethylene carbonate (EC) and propylene carbonate (PC).

Example 2

A non-aqueous electrolyte secondary battery was obtained in the same manner as in Example 1, except that polyvinylidene fluoride (PVdF) was added such that the polyvinylidene fluoride (PVdF) was included at 3.3% by volume with respect to the total volume of the finally obtained positive electrode when a positive electrode active material slurry and a negative electrode active material slurry were each prepared.

Comparative Example 1

A non-aqueous electrolyte secondary battery was obtained in the same manner as in Example 1, except that the amount of the electrolyte solution to be injected was regulated such that the liquid volume coefficient reached 1.35.

Comparative Example 2

A non-aqueous electrolyte secondary battery was obtained in the same manner as in Example 1, except that a polyvinylidene fluoride (PVdF) solution was not added when a positive electrode active material slurry and a negative electrode active material slurry were each prepared. In the non-aqueous electrolyte secondary battery, collapse of the electrode active material layer was observed when the electrolyte solution was injected, and therefore, evaluation of cycle durability was not carried out.

Comparative Example 3

A non-aqueous electrolyte secondary battery was obtained in the same manner as in Example 1, except that polyvinylidene fluoride (PVdF) was added such that the polyvinylidene fluoride (PVdF) was included at 7.9% by volume with respect to the total volume of the finally obtained positive electrode when a positive electrode active material slurry and a negative electrode active material slurry were each prepared.

<Evaluation of Cycle Durability of Non-Aqueous Electrolyte Secondary Battery>

With regard to the non-aqueous electrolyte secondary batteries manufactured in Example 1 and Comparative Example 1, the cycle durability was evaluated by the following method. At a measurement temperature of 45° C., for charging, constant current charging was performed until the voltage reached 4.2 V at a current value of 0.5 C, and then constant voltage charging was performed at 4.2 V until the charging current reached 0.025 C. For discharging, an operation in which discharging was performed until the voltage reached 2.5 V at a current value of 0.5 C (which is defined as one cycle) was repeatedly performed for 300 cycles. At that time, constant current charging was performed until the voltage reached 4.2 V at a current value of 0.05 C at every 25 cycles, and then constant voltage charging was performed at 4.2 V until the charging current reached 0.01 C. An operation in which discharging was performed until the voltage reached 2.5 V at a current value of 0.05 C was carried out. Ratios (discharge capacity retention rates [%]) of the discharge capacity of the $200^{th}$ cycle and the $300^{th}$ cycle with respect to a discharge capacity of the $100^{th}$ cycle defined as 100% were determined and the results are shown in Table 1 below.

TABLE 1

| | Capacity retention rate [%] | | |
|---|---|---|---|
| Number of cycles | 100 | 200 | 300 |
| Example 1 | 100 | 53 | 32 |
| Comparative Example 1 | 100 | 47 | 19 |

As described above, in Comparative Example 2 in which an attempt to manufacture an electrode was made without using a binder, the electrode active material layer collapsed upon injection of the electrolyte solution when the liquid volume coefficient of the battery was increased, and thus, a battery could not be manufactured. In contrast, in Example 1, the shape of the electrode could be retained even in a case where the liquid volume coefficient of the battery was increased to 1.5 by incorporating a binder formed of a predetermined amount of PVdF in a non-crystallized state into the active material layer as shown in Table 1, and thus, as compared with Comparative Example 1 in which the liquid volume coefficient of the battery was 1.35, the capacity retention rate after 300 cycles was improved by 13%. From these results, it was shown that the battery manufactured using the electrode for a non-aqueous electrolyte secondary battery according to the present invention exhibited excellent cycle durability even when the liquid volume coefficient was increased.

<Evaluation of Discharge Rate Characteristics>

In addition, with regard to the non-aqueous electrolyte secondary batteries obtained in Example 1, Example 2, and Comparative Example 3, the rate characteristics of 0.5 C/0.05 C were measured by a constant current discharging method. The obtained results are shown in Table 2.

TABLE 2

| | Content of PVdF | Rate characteristics (0.5 C/0.05 C) |
|---|---|---|
| Example 1 | 1.7% by volume | 82% |
| Example 2 | 3.3% by volume | 83% |
| Comparative Example 3 | 7.9% by volume | 78% |

From the results shown in Table 2, it was found that the battery having a content of polyvinylidene fluoride (PVdF) of 7.9% by volume had a deterioration in rate characteristics, as compared with the battery having a content of polyvinylidene fluoride (PVdF) of 1.7% by volume (Example 1) and the battery having a content of polyvinylidene fluoride (PVdF) of 3.3% by volume (Example 2).

This application is based on Japanese patent application No. 2017-196953 filed on Oct. 10, 2017, and its disclosure is incorporated as a whole by reference.

REFERENCE SIGNS LIST 10, 50 Bipolar secondary battery
11 Current collector
11a Outermost layer current collector on positive electrode side
11b Outermost layer current collector on negative electrode side
13 Positive electrode active material layer
15 Negative electrode active material layer
17 Electrolyte layer
19 Single battery layer
21, 57 Power generating element
23 Bipolar electrode
25 Positive electrode current collecting plate (positive electrode tab)
27 Negative electrode current collecting plate (negative electrode tab)
29, 52 Laminate film
31 Seal part
58 Positive electrode tab
59 Negative electrode tab 101 PVdF
102 Electrode active material

The invention claimed is:

1. A non-aqueous electrolyte secondary battery comprising:
 an electrode comprising:
  a current collector, and
  an electrode active material layer arranged on a surface of the current collector, the electrode active material layer including an electrode active material and a binder formed of polyvinylidene fluoride (PVdF), the polyvinylidene fluoride (PVdF) being in a non-crystallized state and included in a range of 0.5 to 3.3% by volume with respect to a total volume of the electrode in the electrode active material layer;
 wherein the non-aqueous electrolyte secondary battery has liquid volume coefficient of 1.4 or more.

2. The non-aqueous electrolyte secondary battery of claim 1, wherein the electrode active material layer further includes a conductive aid.

3. The non-aqueous electrolyte secondary battery of claim 1, wherein a thickness of the electrode active material layer is 150 to 1,500 μm.

* * * * *